US012151836B2

(12) United States Patent
Bouthiette

(10) Patent No.: US 12,151,836 B2
(45) Date of Patent: Nov. 26, 2024

(54) SYSTEM AND METHOD FOR GRABBING AND FILLING PILLS INTO BLISTER PACKS

(71) Applicant: 9155-0020 QUÉBEC INC., Granby (CA)

(72) Inventor: Etienne Bouthiette, Granby (CA)

(73) Assignee: 9155-0020 Quebec Inc., Quebec (CA)

( * ) Notice: Subject to any disclaimer, the term of this patent is extended or adjusted under 35 U.S.C. 154(b) by 0 days.

(21) Appl. No.: 17/960,595

(22) Filed: Oct. 5, 2022

(65) Prior Publication Data

US 2023/0140779 A1 May 4, 2023

Related U.S. Application Data

(60) Provisional application No. 63/263,351, filed on Nov. 1, 2021.

(51) Int. Cl.
*B65B 11/52* (2006.01)
*A61J 7/00* (2006.01)
(Continued)

(52) U.S. Cl.
CPC ............. *B65B 11/52* (2013.01); *A61J 7/0069* (2013.01); *B65B 5/105* (2013.01); *B65B 57/16* (2013.01);
(Continued)

(58) Field of Classification Search
CPC ..... G07F 17/0092; G07F 11/46; G46H 20/13; B65B 35/06; B65B 5/10; B65B 5/06;
(Continued)

(56) References Cited

U.S. PATENT DOCUMENTS 3,986,638 A 10/1976 Dehart
4,026,091 A 5/1977 Pearson
(Continued)

FOREIGN PATENT DOCUMENTS

CA 2823842 A1 2/2015
CA 2843074 A1 2/2015
(Continued)

OTHER PUBLICATIONS

"Safe, Slim, Smarter Robot Hazard Prevention Solution based on AI Smart Camera" by ADLINK Technology Inc. https://www.adlinktech.com/en/AI_Vision_Case_Smart_Camera_Robot_Hazard_Prevention (Year: 2021).*

*Primary Examiner* — Thomas M Wittenschlaeger
*Assistant Examiner* — Himchan Song
(74) *Attorney, Agent, or Firm* — Hall Estill Law Firm

(57) ABSTRACT

A system for grabbing and filling pills into a blister pack is provided and associated corresponding method. The system includes a vacuum pill-manipulator provided with prongs having holes at their tip to retain pills. The vacuum pill-manipulator is configured to transition from a pill-retaining configuration where suction is applied at the tip of each prong to hold the pills during movement, to a pill-releasing configuration where suction is released to drop the pills in corresponding pill-chambers. A robotized arm is provided with the vacuum pill-manipulator, and is controllable to: move the vacuum pill-manipulator from a pill-container rack, for grabbing a pill-container, to a pill-container retaining station, to suction pills at the tips of the prongs; and move, in the pill-retaining configuration, the vacuum pill-manipulator to the blister pack location, and position the vacuum pill-manipulator to align the tip of each prong with the corresponding pill-chamber for the pill-releasing configuration.

24 Claims, 17 Drawing Sheets

(51) Int. Cl.
*B65B 5/10* (2006.01)
*B65B 57/16* (2006.01)
*A61J 1/03* (2023.01)

(52) U.S. Cl.
CPC ............ *A61J 1/035* (2013.01); *A61J 2200/70* (2013.01); *A61J 2200/74* (2013.01)

(58) Field of Classification Search
CPC ......... B65B 5/105; B65B 57/14; B65B 57/16; B65B 35/18; B65B 35/68; B65B 11/52; A61J 1/035; A61J 2200/70; A61J 2200/74; A61J 7/0069
See application file for complete search history.

(56) References Cited

U.S. PATENT DOCUMENTS

| | | | | |
|---|---|---|---|---|
| 5,571,258 | A | 11/1996 | Pearson | |
| 5,788,079 | A | 8/1998 | Bouthiette | |
| 6,607,094 | B2 | 8/2003 | MacDonald | |
| 6,887,431 | B1 | 5/2005 | Vann | |
| 8,060,248 | B1 * | 11/2011 | Boyer | B65B 57/20 700/235 |
| 8,230,662 | B2 | 7/2012 | Boutin | |
| 10,106,283 | B2 | 10/2018 | Akdogan | |
| 10,150,581 | B2 | 12/2018 | Bouthiette | |
| 10,351,270 | B2 | 7/2019 | Bouthiette | |
| 10,529,166 | B2 | 1/2020 | Bouthiette | |
| 2001/0019065 | A1 * | 9/2001 | William | G07F 11/32 221/109 |
| 2013/0340390 | A1 * | 12/2013 | Carson | G07F 17/0092 53/473 |
| 2015/0128534 | A1 | 5/2015 | Bouthiette et al. | |
| 2016/0083120 | A1 | 3/2016 | Bouthiette | |
| 2017/0021950 | A1 | 1/2017 | Bouthiette | |
| 2020/0016039 | A1 * | 1/2020 | Boutin | A61J 7/0076 |
| 2020/0105086 | A1 * | 4/2020 | Bouthiette | G07F 11/165 |

FOREIGN PATENT DOCUMENTS

| | | | |
|---|---|---|---|
| CA | 2959396 | A1 | 9/2018 |
| WO | 9617776 | A1 | 6/1996 |

* cited by examiner

SYSTEM AND METHOD FOR GRABBING AND FILLING PILLS INTO BLISTER PACKS

PRIOR APPLICATION

The present application claims priority from U.S. provisional patent application No. 63/263,351, filed on Nov. 1, 2021, and entitled "SYSTEM AND METHOD FOR GRABBING AND FILLING PILLS INTO BLISTER PACKS", the disclosure of which being hereby incorporated by reference in its entirety.

TECHNICAL FIELD

The technical field relates to systems and methods for filling pills or other medicine in packaging, such as blister packs. In particular, the present application relates to an automated stand-alone system for grabbing solid medicine such as pills and filling them in blister pack-type pill packaging.

BACKGROUND

Blister packaging, often referred as blistered packs or blister cards, are commonly used in the pharmaceutical field for protecting and distributing pills or any type of medicine provided in single units, such as tablets or capsules. A blister pack usually comprises several containers or chambers, in which pills are deposited. The containers are then sealed with material such as paperboard, aluminum foil or plastic, to secure and protect the pills from external factors, such as humidity or dust.

Commonly, blister packs are manually filed by professionals, such as pharmacists or lab technicians. The process of filling the packaging requires the professional to select a certain number of pills corresponding to a given prescription and to fill corresponding containers of the blister pack with the selected pills. This process is laborious, time consuming and prone to errors, especially for complex prescription including several medicines that need to be taken at different times, over long periods.

As an alternative, stand-alone systems are available on the market to automatically fill blister packaging. Those stand-alone systems are adapted to fill pills in blister packaging, but they are generally bulky and cumbersome, and cannot be installed and operated in pharmacy laboratories. They are also very expensive, and therefore can only be cost-effective for very large volumes of prescriptions.

In addition, one shortcoming of existing systems is that, when releasing pills in blister pack containers, it sometimes occurs that the medication bounces out of the container and lands outside the tray system or in another container. Another shortcoming of existing systems is that they lack means to verify that each individual prescription has been correctly followed. Another drawback of existing systems is that, when they operate with a grabbing tool, the tool may retain more than one pill or even no pill at all, and means to detect such situations are suboptimal. Typically, only one pill at a time should be picked and placed in a corresponding blister pack.

Hence, in light of the above, a need exists for systems and methods to overcome at least some of the aforementioned limitations of current filling systems.

SUMMARY

According to an aspect, an automated blister pack filling system for grabbing and filling pills into a blister pack is provided. The blister pack is provided with rows of pill-chambers. The pill-filling system comprises a vacuum pill-manipulator and a robotized arm.

The vacuum pill-manipulator is provided with prongs having open-ended tips to suction pills. Each prong is arranged to be positioned opposite to one of the pill-chambers of the blister pack. The vacuum pill-manipulator may be configured to transition from a pill-retaining configuration to a pill-releasing configuration. In the pill-retaining configuration, suction is applied at the open-ended tip of each prong to hold the pills in place when the vacuum pill-manipulator moves. In the pill-releasing configuration, suction is reduced from each prong to drop the pills in a corresponding pill-chamber, when the prongs are aligned with corresponding pill-chambers.

The collaborative robot is provided with the robotized arm. The collaborative robot controls the robotized arm and the vacuum pill-manipulator. The robotized arm may be controlled by the collaborative robot to move the vacuum pill-manipulator between a pill-rack position, a pill-grabbing position, and a blister-pack filling position. In the pill-rack position, the vacuum pill-manipulator is configured to retrieve a pill-container from a pill-container rack. In the pill-grabbing position, the vacuum pill-manipulator is configured to place the pill-container on a pill-container retaining station and suction pills from the pill-container, the vacuum pill-manipulator is in the pill-retaining configuration. In the blister-pack filling position, the vacuum pill-manipulator is configured to align the prongs of the vacuum pill-manipulator with the corresponding pill-chambers of the blister pack, the vacuum pill-manipulator transitions to the pill-releasing configuration for filling the blister pack with the pills.

In some embodiments, the robotized arm is configured to move with at least six degrees of freedom (DoF).

In some embodiments, the system may comprise a vacuum pump and a medication dispensing system application. The vacuum pump may provide suction for the prongs of the vacuum pill-manipulator. The medication dispensing system application may be in communication with the collaborative robot and the vacuum pump and is configured to control both the collaborative robot and the vacuum pump based on instructions derived from electronic prescriptions.

In some embodiments, the medication dispensing system application is configured to compare the pill-retaining status of each prong of the vacuum pill-manipulator with information received from a prescription instruction. The medication dispensing application may also be configured identify discrepancies between the pill-retaining status and the received information from the prescription instruction.

In some embodiments, the prongs may also be associated light transmitters. The light transmitters are associated with the prongs for emitting light at their open-ended tips. The system can further include photo-resisting sensors and a controller in communication with the photo-resisting sensors. The sensors may be positioned in such a way as to detect the light from the corresponding light transmitters of the vacuum pill-manipulator. The controller is configured to detect the pills at the open-ended tips of the prongs. When a weak signal or no signal is received from a corresponding photo-resisting sensor, it means that the pill is properly suctioned as the pill prevents light from reaching the corresponding photo-resisting sensor. Then, the controller is configured to send a signal with the pill-retaining status of each prong of the vacuum pill-manipulator to the medication dispensing system application.

In some embodiments, the pill-container retaining station can further include a load cell to measure a weight of the pills within the pill-container. The load cell may be in communication with the at least one controller.

In some embodiments, the controller can be configured to send a second signal of the measured weight of the pills within the pill-container to the medication dispensing system application. When the measured weight is received, the medication dispensing system application may determine whether the pill-container should be refilled based on the measured weight.

In some embodiments, the pill-container rack includes a plurality of pill-containers. Each pill container is provided with a pill-container coupling. The vacuum pill-manipulator also provides a manipulator-coupling which is adapted to connect to the pill-container coupling of each of the pill-containers. The manipulator-coupling allows the vacuum pill-manipulator to retrieve one of the pill-containers from the pill-container rack.

In some embodiments, the pill-container coupling comprises a ferromagnetic element and the manipulator-coupling comprises an electromagnet. The vacuum pill-manipulator can be adapted to selectively electromagnetically to the pill-container.

In some embodiments, the pill-container retaining station includes a station-coupling. The station-coupling is adapted to connect the pill-container coupling of each of the pill-containers, to retain the pill-container while the pills are being suctioned by the vacuum pill-manipulator.

In some embodiments, the system can further include at least one tray assembly for supporting the blister pack when the vacuum pill-manipulator fills the pills into the pills-chambers.

In some embodiments, the at least one tray assembly comprises a depositing plate on which the pills are first deposited, before they are being pushed into the pill-chambers. The depositing plate can be made of a material having elastic or damping properties chosen to reduce or avoid bouncing of the pills when dropped onto the depositing plate.

In some embodiments, the at least one tray assembly comprises a tray-coupling. The manipulator-coupling of the vacuum pill-manipulator can be adapted to connect to the tray-coupling, allowing the robotized arm to move the at least one tray assembly from one location to another.

In some embodiments, the tray-coupling comprises a ferromagnetic element and the manipulator-coupling of the vacuum pill-manipulator comprises an electromagnet that can be adapted to selectively electromagnetically connect to the tray-coupling.

In some embodiments, the system can further include at least one camera to detect humans within a given security zone. The medication dispensing system application can further be configured to stop or reduce the speed of the robotized arm when a human is detected within the security zone.

According to another aspect, a method for grabbing and filling pills into a blister pack is provided. The method includes general steps of suctioning pills at the tips of prongs provided by a vacuum pill-manipulator. The method can include a step of providing a collaborative robot with a robotized arm. A vacuum pill-manipulator can be provided at an end of the robotized arm. The collaborative robot can control the robotized arm and the vacuum pill-manipulator. The robotized arm is movable between a pill-rack position, a pill-grabbing position and a blister-pack filling position by the collaborative robot. The method can include another step of retrieving a pill-container from a pill-container rack by the vacuum pill-manipulator while the robotized arm is in the pill-rack position. Another step may include moving the robotized arm from the pill-rack position to the pill-grabbing position to position the pill-container on a pill-container retaining station with the vacuum pill-manipulator. Another step may include suctioning pills from the pill-container. In the suctioning step, the pills can be suctioned at open-ended tips of prongs extending from the vacuum pill-manipulator. Each prong is arranged to be positioned opposite to a pill-chamber of the blister pack. Another step may include retaining the pills, by applying suction at the open-ended tips of the prongs, allowing the pills to be held in place during the movement of the vacuum pill-manipulator. The method may include another step of moving the robotized arm from the pill-grabbing position to the blister pack filing position. The step may also include aligning the prongs of the vacuum pill-manipulator opposite to corresponding pill-chambers of the blister pack. Furthermore, the method may include another step of releasing the pills by reducing suction to drop the pills when each prong is aligned with a corresponding pill-chamber of the blister pack. In some embodiments, the robotized arm can be moved with at least six degrees of freedom (DoF).

In some embodiments, the step of suctioning the pills from the pill-container comprises providing suction to the prongs of the vacuum pill-manipulator with a vacuum pump. The collaborative robot and the vacuum pump can communicate with a processing device running a medication dispensing system. The method further includes the step of controlling the collaborative robot and the vacuum pump via the medication dispensing system. The control of the collaborative robot and the vacuum pump is based on instructions derived from electronic prescriptions.

In some embodiments, the method further includes a step of receiving information from a prescription instruction to the medication dispensing system application. Another step includes comparing a retaining status of each prong of the vacuum pill-manipulator based on the received information. The comparison can be realised via the medication dispensing system application. Another step includes identifying discrepancies between the retaining status of each prong and the received information.

In some embodiments, once the previous steps are realised, the method further includes a step of comparing a pill-retaining status of each prong of the vacuum pill-manipulator with information in a prescription file. After the comparison, the step may also include removing extra pills from at least some of the prongs of the vacuum pill-manipulator.

In some embodiments, the vacuum pill-manipulator comprises light transmitters. Each light transmitter is associated with a prong of the vacuum pill-manipulator. The method includes a step of emitting light at the open-ended tips of the prongs. Another step includes detecting the pills at the open-ended tips of the prongs via photo-resisting sensors. The photo-resisting sensors are positioned to detect the emitted light from the light transmitter. Properly suctioned pills are detected when the pills prevent the light emitted by the light transmitters to reach the photo-resisting sensors. Upon detecting the pills, another step includes sending a signal to the medication dispensing system application. The transmitted signal includes the pill-retaining status of each prong of the vacuum pill-manipulator.

In some embodiments, the step of detecting the pills at the open-ended tips of the prongs can include receiving no signal or a weak signal from a corresponding photo-resisting sensor.

In some embodiments, the method further includes a step of measuring a weight indicative of the weight of the pills within the pill-container. Another step includes sending a second signal of the measured weight to the medication dispensing system application. Another step includes determining whether the pill-container should be refilled based on the measured weight. The determination step being realised via the medication system application.

In some embodiments, the pill-container rack includes a plurality of pill-containers. A container-coupling is provided for each one of the plurality of pill-containers. The method further includes a step of coupling a manipulator-coupling provided on the vacuum pill-manipulator with the pill-container coupling of a given one of the pill-containers. The coupling step being realised prior to retrieving the pill-container from the pill-container rack.

In some embodiments, the pill-container coupling comprises a ferromagnetic element and the manipulator-coupling comprises an electromagnet. The method further includes a step of electromagnetically connecting the manipulator-coupling to the pill-container coupling.

In some embodiments, the pill-container retaining station includes a station-coupling. The method further includes a step of connecting the pill-container coupling to the station-coupling to retain the pill-container, while the pills are suctioned by the vacuum pill-manipulator.

In some embodiments, when the previous steps are completed, the method can include a step of moving a tray assembly from a filling station to a stacking station, with the robotized arm. The tray assembly may include the mounting tray, the depositing plate, and the sliding tray.

In some embodiments, the method further includes supporting the blister pack on at least one tray assembly when the pills are released into the pills-chambers of the blister pack.

In some embodiments, the at least one tray assembly includes a depositing plate. The depositing plate is made of a material having elastic or damping properties. The properties are chosen to reduce or avoid the bouncing of the pills when they are dropped onto the depositing plate. The method further includes the steps of receiving the released pills onto the depositing plate and pushing the received pills from the depositing plate into the pill-chambers of the blister pack. The pushing step being realised by the robotized arm.

In some embodiments, the at least one tray assembly includes a tray-coupling. The method includes a step of connecting the tray-coupling to the manipulator-coupling provided with the vacuum pill-manipulator. After the connection step, the method also includes a step of moving the at least one tray assembly from one location to another. The moving step being realised by the robotized arm.

In some embodiments, the tray-coupling includes a ferromagnetic element, and the second manipulator includes an electromagnet. The method further includes electromagnetically connecting the second manipulator to the tray-coupling.

In some embodiments, the method further includes a step of imaging a given security zone via at least one camera. Another step includes detecting a human within the security zone. The detection step is realised by the at least one camera. Another step includes stopping or reducing a speed of the robotized arm based on the detection of the human within the security zone.

BRIEF DESCRIPTION OF THE DRAWINGS

The features and advantages of the present invention will become apparent from the following detailed description, taken in combination with the appended drawings, in which.

DETAILED DESCRIPTION

In the following description, the same numerical references refer to the similar elements. In addition, for the sake of simplicity and clarity, namely, to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

In addition, although the optional configurations as illustrated in the accompanying drawings comprise various components, not all of these components and configurations are essential and thus should not be taken in their restrictive sense, i.e., should not be taken as limiting the scope of the present disclosure. The components or method steps of the different embodiments described below can be combined to form other embodiments, according to the present disclosure.

Figure 13:
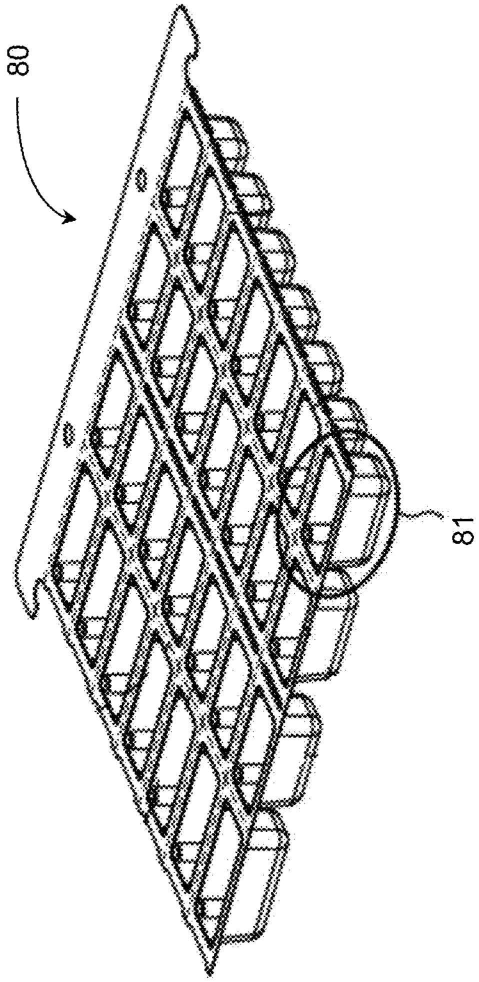
FIG. 13 is a perspective view of a blister pack being provided with rows of pill-chambers, according to an embodiment.

Moreover, although the present system may be used to autonomously transfer pills into blisters packs, the system may also be used with other types of medicine and fill different types of packages. In this perspective, the use of terms such as "medicine", "pill", "drugs", "pharmacy", "pharmacist", "technician", "blister pack", "pill packaging" and other terms related to the treatment of medicines, should not be limited to the present scope of the disclosure. A possible configuration of a blister pack 80 is shown in FIG. 13. While the blister pack is shown with rows of pill-chambers 81, other configurations are possible, such as disk or circular configurations. Also, the term professional may be used to define both a pharmacist and a technician.

Figure 1:
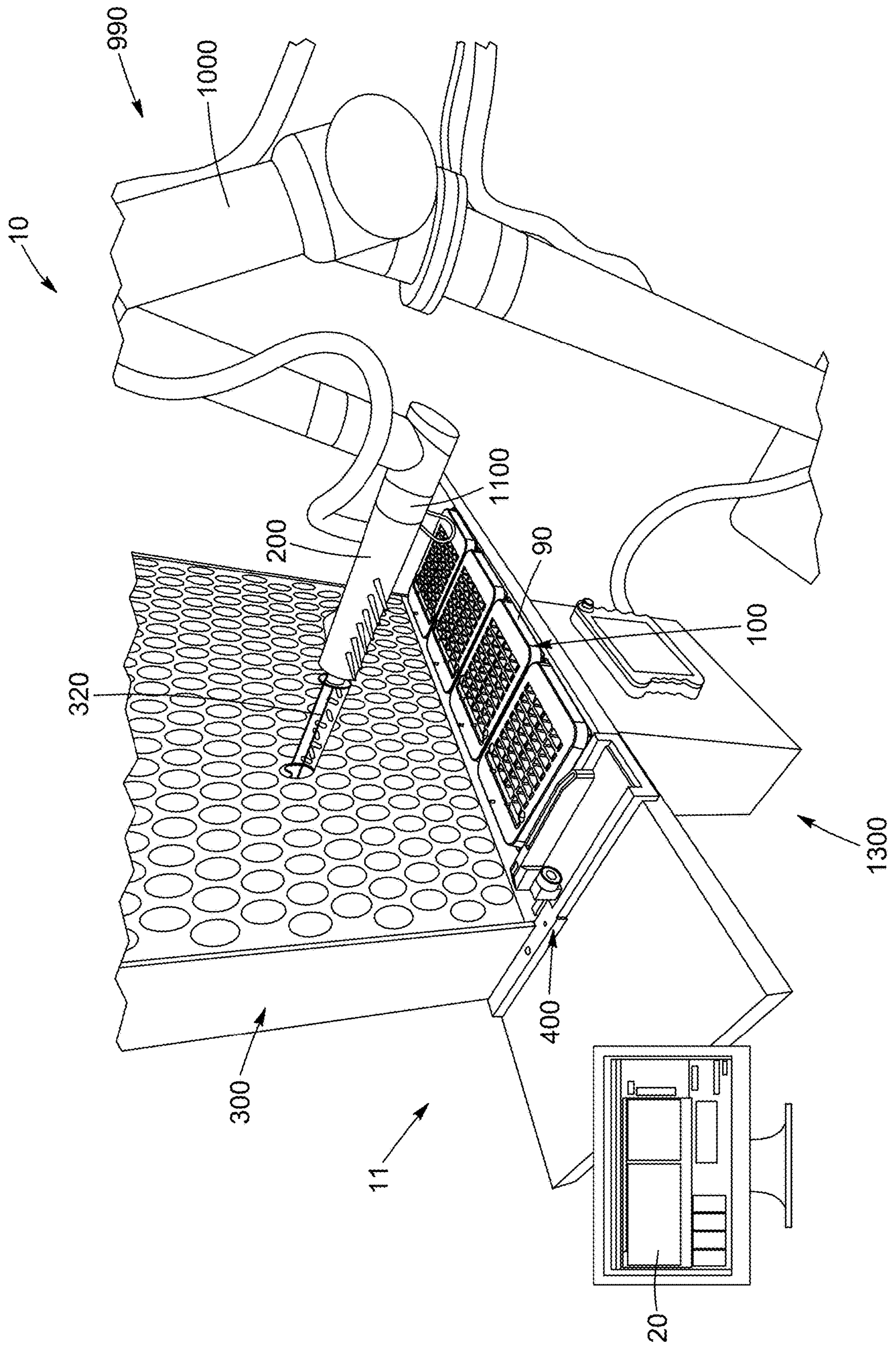
FIG. 1 is a view of an automated blister pack filling system for grabbing and filling pills in blister-packs, where a portion of a collaborative robot is shown, with its robotized arm provided with a vacuum pill-manipulator, according to a possible embodiment.

With reference to FIG. 1, an automated blister pack filling system 10, hereinafter referred to as "filling system", is provided, for grabbing pills and filling blister packs. In this embodiment, the filling system comprises a collaborative robot 990 provided with a robotized arm 1000 and a vacuum pill-manipulator 200 (i.e., a specialized end-effector). The vacuum pill-manipulator 200 may comprise a plurality of prongs 260 (identified in FIG. 3) with holes at their end, defining open-ended tips 261. Suction is applied through the vacuum pill-manipulator 200 to retain pills at the open-ended tips 261 of the prongs 260.

In some embodiments, the vacuum pill-manipulator 200 can be operated in at least two configurations: a retained configuration and a released configuration, also referred to as "pill-retaining configuration" and "pill-releasing configuration". When in the pill-retaining configuration, the vacuum pill-manipulator suctions pills at the open-ended tips of the prongs, such that the pills are retained by the pill-manipulator. The robotized arm 1000 can move from one place to another, and position and align the manipulator 200 with a blister pack. In the pill-releasing configuration, suction is reduced or stopped, causing the pills to drop from the prongs in corresponding pill-chambers of the blister pack. The prongs 260 are arranged to be positioned opposite one of the pill-chambers 81 of the blister pack 80, such that the open-ended tip of each prong face a corresponding pill-chamber when suction is released from the prongs, causing the pills to be dropped inside the pill-chambers 81 of the blister pack 80.

Still referring to FIG. 1, the collaborative robot 990 can be configured to control both the robotized arm 1000 and the vacuum pill-manipulator 200. By "collaborative robot" it is meant a robot provided in a collaborative environment, close to humans and capable of performing tasks autonomously, such as filing blister-packs with pills (e.g., in a medical laboratory, pharmacy or other environment where there is handling of pills). The collaborative robot 990 can also be referred to as a "cobot". The collaborative robot 990 comprises sensors, cameras and software modules to control its behaviour. In some configurations, AI-modules can be included in the robot software modules, such that the robot can be trained to learn and repeat specific tasks, for example to move the vacuum-pill manipulator from one location to another in a working station. In some embodiments, the collaborative robot 990 is programmed or configured to move the robotized arm 1000 between a pill-rack position, a pill-grabbing position and a blister-pack filling position. The pill-rack position corresponds to a zone or location where the robotized arm and the manipulator are facing the pill-rack, and in which the pill-manipulator can be moved to retrieve or insert a pill-container from/in the rack. The pill-grabbing position corresponds to a zone or location where the robotized arm and the manipulator are facing a pill-container retaining station, on which the pill-container can be placed so that the pill-manipulator can pick or suction pills from the container. The blister-pack position corresponds to a zone or location where the robotized arm and the pill-manipulator are facing tray assemblies provided with blister packs, so that the pill-manipulator can fill pill-chambers of the blister packs with the pills picked from the pill-container.

When in the pill-rack position, the robotized arm 1000 can move the vacuum pill-manipulator 200 to retrieve a pill-container from a pill-container rack 300. An example of a pill-container rack 300 is shown in FIG. 1, and in FIG. 5. Openings or "drawers" provided in the rack are shaped and configured to receive corresponding pill-containers, to store the different types of pills and medicine. Different means can be provided on the pill manipulator to retrieve the pill-containers, as will be explained in more detail below. The collaborative robot 990 can move the robotized arm 1000 from the pill-rack position to the pill-grabbing position, to place the pill-container on a pill-container retaining station. When the robotized arm is in the pill-grabbing position, suction is applied to the pill-manipulator, such that the vacuum pill-manipulator 200 can retrieve pills from the pill container, the pill-manipulator being thus in the pill-retaining configuration. The robot than moves the arm 1000 and manipulator 200 in the blister pack-filling position. Once the vacuum pill-manipulator 200 faces a blister pack, the robotized arm 1000 aligns the prongs of the vacuum pill-manipulator 200 with the pill-chambers of the blister pack 80 for filling the blister pack 80 with the pills. In other words, the vacuum pill-manipulator is positioned so as to align the prongs 260 of the vacuum pill-manipulator 200 with the corresponding pill-chambers 81 of the blister pack 80, and transitions to the pill-releasing configuration.

An example of a blister pack 80 is shown on FIG. 13. A blister pack 80 can correspond to a plastic packaging, shaped and configured to store individual pills, groups of pills (or equivalent medicine, caplets, capsules and the likes) within containers or pill-chambers 81. This type of packaging is generally used by people who need to take medication on a regular basis or have a need to take medication at specific intervals. To this end, some blister packs contain a certain number of pill-chambers, corresponding to the different times in a day. For example, some blister packs may include pill-chambers for each day of a month. Alternatively, others may include pill-chambers for different periods of the day such a morning, noon, evening, and night, for a whole week. The pill-chambers can be substantially rectangular and arranged in rows and lines (as illustrated in FIG. 13) or they can have a triangular shape and be organized to form a circle. Other shapes and configurations are possible. The blister pack illustrated in FIG. 13 has a seven-day format, including twenty-eight containers. The type of pills contained within the blister packs 80 may vary depending on a given client's prescription. A blister pack may contain pills shaped as tablets, capsules, lozenges. The pills or medicine can have various shapes, sizes, and compositions.

Figure 2:
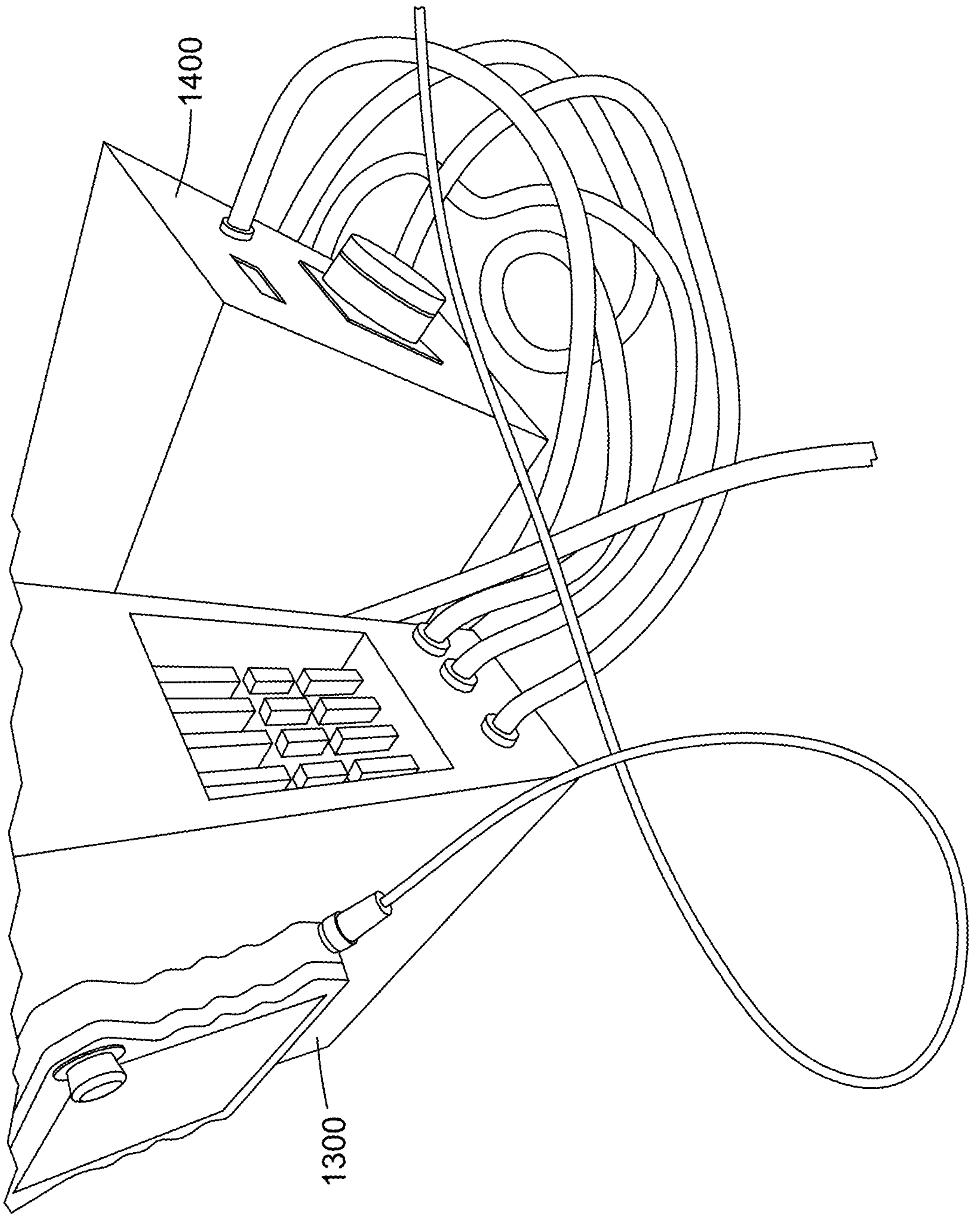
FIG. 2 is a view of a controller for the collaborative robot, and of a vacuum pump for the vacuum pill-manipulator, according to a possible embodiment.

Now referring to both FIGS. 1 and 2, the filling system 10 may be part of a pill-filling station 11. The pill-filling station can be placed in the lab section of a pharmacy, behind the counter where lab technicians or pharmacist work. In some embodiments, the pill-filling station 11 is located where the components of the system 10 interact with each other, to fill the blister packs 80 according to the prescriptions of the patients. The pill-filling station 11 may include a processing device, typically a computer or server 20, running or accessing a medication dispensing system application 500 (identified in FIG. 14) which sends prescription-related instructions and receives the status of the different components of the system 10. The computer 20 can be located close to the pill-filling station 11 and close to a robotic arm controller 1300. However, in some embodiments, the computer 20 is not limited to be proximate to the pill-filling station 11 and may be, for instance, at a remote location or even be a cloud-based device (i.e., physical or virtual servers or containers hosted by a cloud provider). Along with the collaborative robot 990 (i.e., including the robotized arm 1000 and the vacuum pill-manipulator 200), the filling system 10 may also comprise a robotic arm controller 1300; a vacuum pump 1400; a pill-container rack 300; a pill-container retaining station 400; and with one or more tray assembly 90, for receiving the blister packs.

Figure 6:
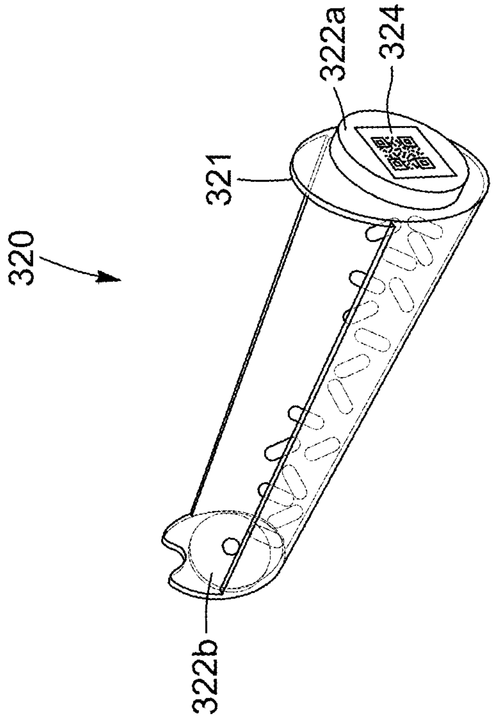
FIG. 6 is a top perspective view of a pill-container, according to a possible embodiment.
Figure 12:
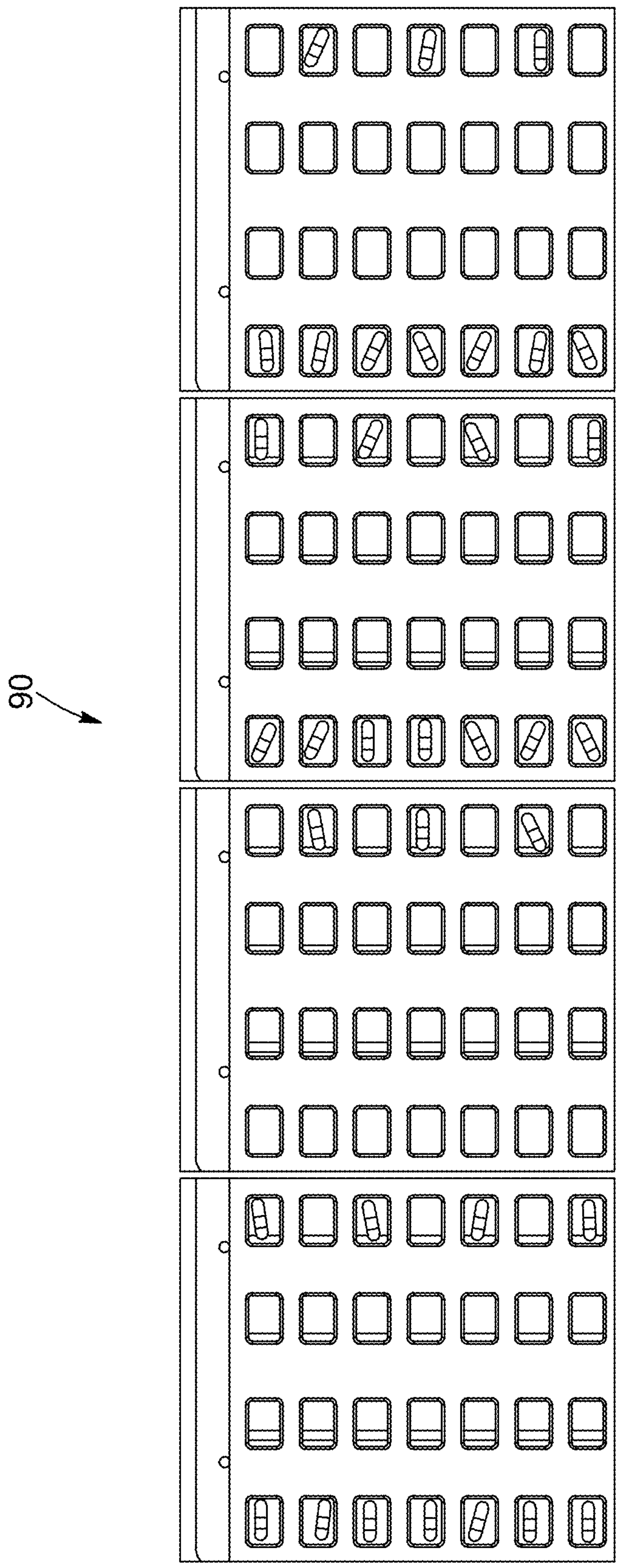
FIG. 12 is a photograph of a plurality of tray assemblies, in which pills are displayed on top of pill-drop surfaces of the depositing plates, according to an embodiment.

The robotized arm 1000 is typically part of the collaborative robot 990. The robot 990 can provided by different manufacturers. In the illustrated embodiment, an AUBO™ collaborative robot is shown, but other robot types can be used. In some embodiments, as shown in FIG. 1, for instance, the robotized arm is configured to move with four to seven degrees-of-freedom (DOF), and preferably with at least six DOF. The robotized arm comprises different arm segments articulated one relative to the other about junctions. The junctions of the arm 1000 allows the different arm segments to rotate one relative to the other. In the illustrated embodiment, the arm can move with seven DOF, the degrees of freedom (DOF) allowing the robotized arm to: transport pill-containers 320 (or pill-canisters) filled with pills (an exemplary embodiment is shown in FIG. 6); take a photo of each individual mounting tray (as shown in FIG. 12); and/or slide the sliding tray, and/or to transport the tray assembly 90 from and to the pill-filling station 11. It should be noted that the robotized arm is not limited to seven degrees of freedom and the same above-mentioned actions may be carried out with a robotized arm having five or six degrees of freedom or even more than seven degrees of freedom.

The vacuum pill-manipulator 200 can be provided at one end, or extending from the one end, of the robotized arm 1000 (acting as a specially adapted end effector). The robotized arm 1000 may comprise a tool plate 1100 (identified in FIG. 1), at the end of its outermost segment, to connect with an end effector—in this case to the vacuum pill-manipulator 200. The tool plate 1100 may also comprise input/output ports that links to the robotic arm controller 1300 to enable or disable certain components of the vacuum pill-manipulator 200.

The robotic arm controller 1300 (shown in FIG. 2) can also be provided as part of the collaborative robot 990. The robotic arm controller can be provided by the same manufacturer as the robotized arm 1000 and robot 990. The robotic arm controller 1300 may be directly connected to the computer 20 by an ethernet cable and configured to receive instructions therefrom. Alternatively, a wireless adapter may also be provided to communicate with the computer 20. In the present embodiment, instructions received by the robotic arm controller 1300 can correspond to movements that the robotized arm must perform. The robotic arm controller 1300 also receives inputs and outputs of the components provided with the vacuum pill-manipulator 200, such as lasers, a manipulator-coupling and a barcode reader, which will be further described later on. In some embodiments, it is also possible to send commands to the robotic arm controller 1300 to set specific parameters of the robotized arm 1000, such as speed, acceleration and sensitivity to collision detection. The robotic arm controller 1300 can be prompted to provide different statuses related to the various instructions mentioned above. For example, the robotic arm controller 1300 can be interrogated about the current position, speed and motion of the robotized arm 1000.

Figure 4:
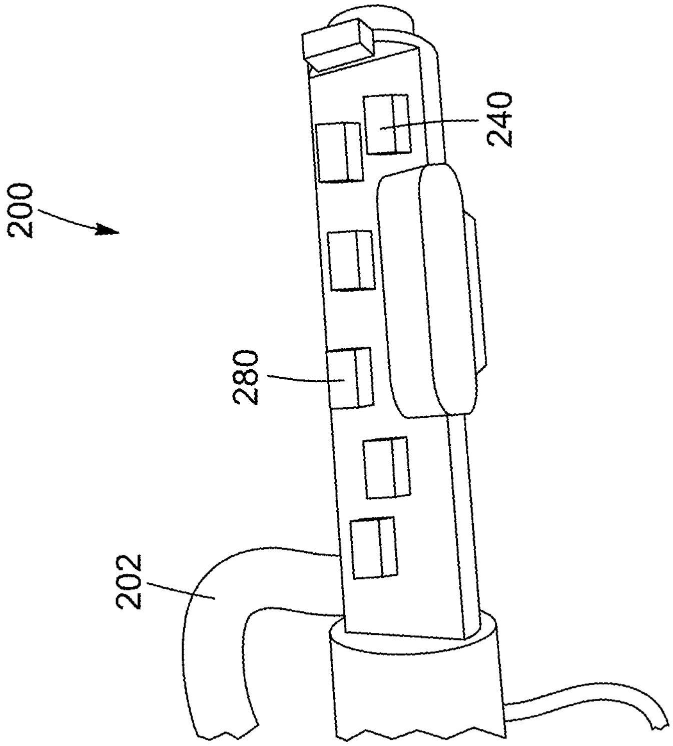
FIG. 4 is a top view of the vacuum pill-manipulator represented in FIG. 3, with its plastic cover assembly removed, the pill-manipulator being positioned above a tray assembly.
Figure 3:
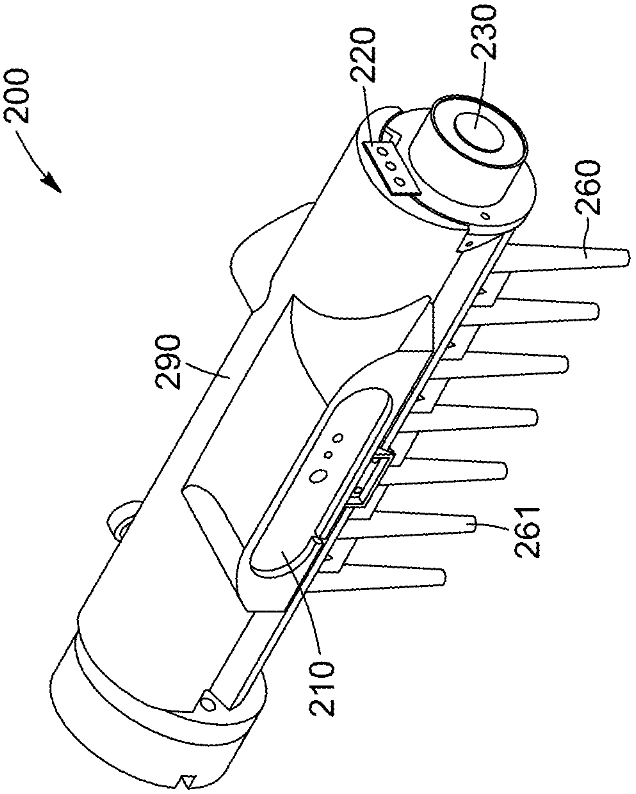
FIG. 3 is a schematic perspective view of a vacuum pill-manipulator, according to a possible embodiment.

Now referring to FIGS. 2 to 4, according to a possible embodiment, the vacuum pill-manipulator 200 comprises a plastic cover assembly 290 and is provided with prongs 260 for suctioning pills at their open-ended tips 261. The open-ended tips 261 of the prongs 260 are open, allowing air to past through and thus retain pills, the holes at the end of the tips being smaller that the pills to suction. The prongs 260 can be molded or attached next to one another or separated individually and are connected to a sealed portion of the vacuum pill-manipulator 200. This way, the prongs 260 can receive suction from the vacuum pump 1400. The prongs can be removable, to adjust the size of the prongs 260 to the size of the pills being manipulated, if necessary. The number of prongs generally equals to the number of pill-chambers in a given blister pack column and may vary depending on the type of pack to be filled. As an example, the vacuum pill-manipulator 200 may comprise seven prongs 260 (as shown in FIG. 3) to fill a seven-day format blister pack, which includes seven pill-chambers per column. The configuration and number of prongs may also vary depending on the format and size of the blister pack.

The vacuum pill-manipulator 200 is connected by a manifold or tube 202 to the vacuum pump which supply suction to the prongs 260. Thus, the sealed portion of the vacuum pill-manipulator can act as a corridor in which fluid can transit, such as air through the prongs to the vacuum pump. When the vacuum pump 1400 is activated, air is suctioned from the external environment through the prongs 260, creating suction. Specifically, once a pill is in contact with the open-ended tip 261 of the prongs, while the vacuum pump is in operation, pressure inside the prong will be greater than the environmental pressure, thereby holding the pill. Hence, in a possible embodiment, the vacuum pump and/or the vacuum pill-manipulator can further be provided with one or more pressure sensors (not shown). A pressure sensor can measure the overall pressure within the vacuum pill-manipulator 200. Based on the measured pressure, a controller and/or computer can determine whether at least one pill is retained by a given one of the prongs. According to the present embodiment, the pressure sensor is integrated to the vacuum pump 1400, the vacuum pump can receive the measured overall pressure of the sensor and send the pressure data corresponding to a state for each prong (a pill is retained or not) to the computer.

The vacuum pill-manipulator 200 may also be provided with light transmitters 240. The light transmitters 240 are each associated with a corresponding prong 260, such that light is emitted at their open-ended tips 261. According to the present embodiment, the light transmitters can be lasers, emitting red lights. However, the colour of the lights may vary depending on preference and/or usage. For example, the lights may be blue, green, purple or any other colour, depending on the type of laser used.

According to a possible embodiment, the vacuum pill-manipulator 200 can also include a manipulator-coupling 230, a barcode reader 220 and a web cam 210. The barcode reader can scan a pill-container 320 corresponding to a given pill prescription. The web cam can be a regular image-camera, able to take photos, and may be used to detect pills in a blister pack for verification purposes, once the filling of a prescription is completed (As shown in FIG. 12). Both the barcode reader 220 and the web cam 210 can be directly connected to the computer to transmit the collected data. The manipulator-coupling 230 can retain a pill-container 320, by locking or retaining on the pill-container coupling 322 (shown in FIG. 6, for example). In some embodiments, the manipulator-coupling 230 can include an electromagnet to electromagnetically connect to electromagnetic couplings, such as the pill-container coupling 322, for example. The vacuum pill-manipulator 200 can hold the pill-container 320 when moving it from a pill-container rack 300 to the pill-container retaining station 400. Equally, the robotized arm 1000 can move a tray assembly 100 to another location by connecting the manipulator-coupling 230 of the vacuum pill-manipulator to a tray-coupling 156 positioned between two tray assemblies 90 (shown in FIG. 10). The system may also allow the vacuum pill-manipulator 200 to be automatically changed on the robotized arm. For example, if a client's prescription requires a different type of blister pack, the robotized arm can detach the current vacuum pill-manipulator (which is typically adapted for a given type of blister pack), and reattach a different vacuum pill-manipulator.

As shown in FIG. 4, a printed circuit board (PCB) 280 is also included to the vacuum pill-manipulator 200. The PCB allows connecting the manipulator-coupling 230, the barcode reader 220 and the light transmitters 240 to the robotic arm controller. More precisely, the PCB connects to the input/output ports provided on the tool plate of the robotized arm. This way, the robotic arm controller can toggle the state of the manipulator-coupling, the barcode reader and the light transmitters (on/off).

Figure 5:
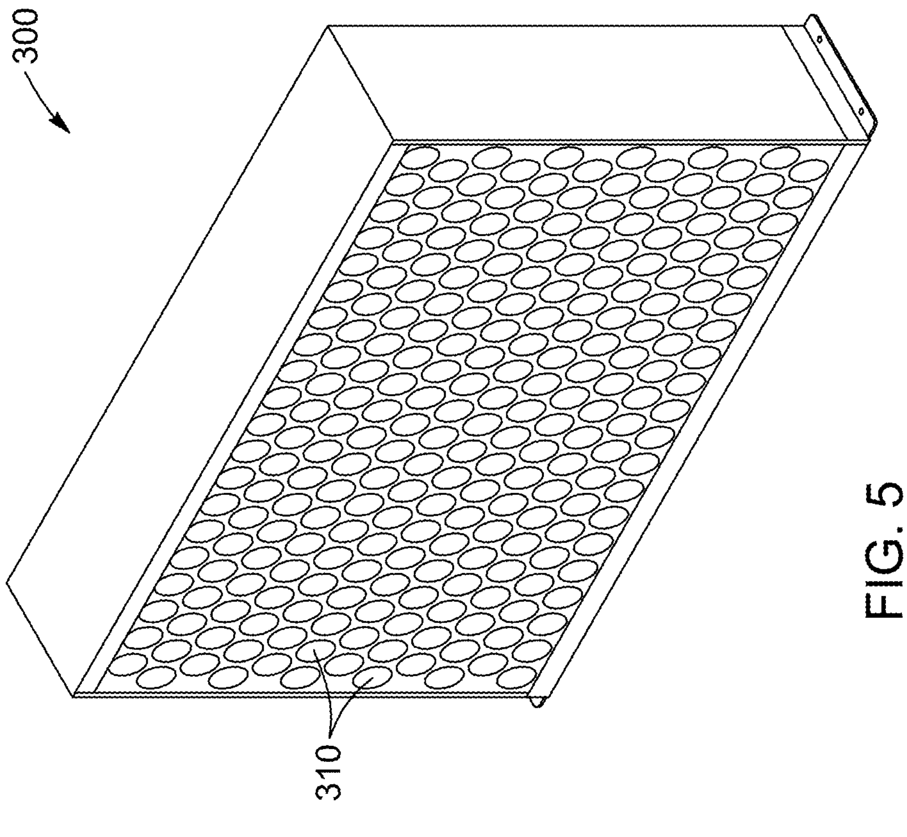
FIG. 5 is a schematic perspective view of a pill-container rack, according to a possible embodiment.

Referring now to FIGS. 5 and 6, in some embodiments, the system may include a pill-container rack 300. The pill-container rack is provided with a plurality of drawers 310. Each drawer is shaped so that it can hold a pill-container 320. The pill-container rack may also include light indicators (not shown). The pill-container rack light indicators can be positioned on the periphery of corresponding drawers, to emit light to indicate which drawer is currently or is soon to be used. The pill-container rack 300 may also be provided with a wireless adapter, such as a Bluetooth adapter, to receive instructions regarding the light indicators. Thus, the computer 20 may send an instruction indicating which light indicator, corresponding to a desired drawer, should be turned on. In possible embodiments, the system 10 may include more than one pill-container rack 300 and each pill rack may be positioned at different pill-filling stations.

Figure 7A:
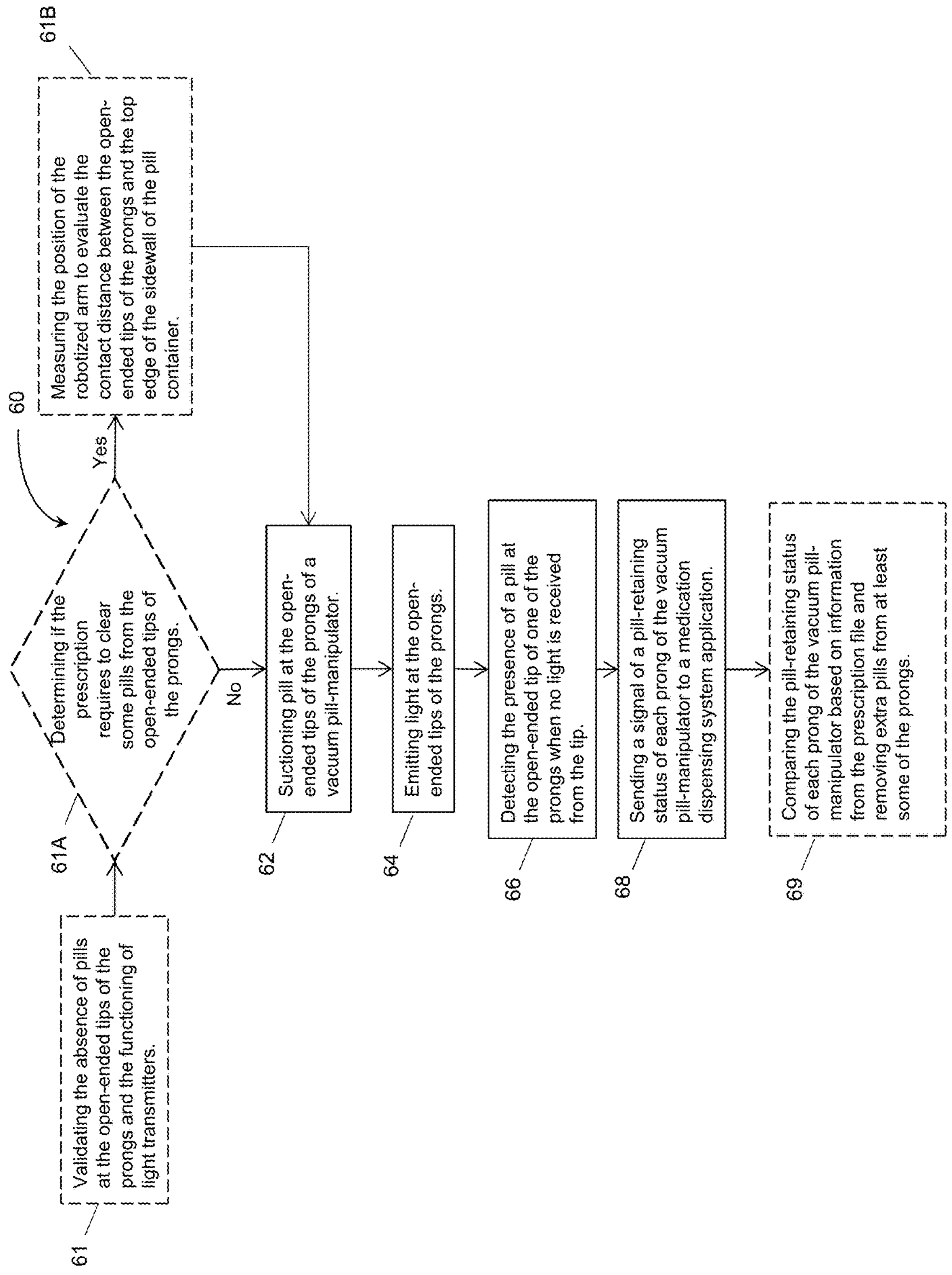
FIG. 7A is a flow chart of steps of a method for operating the automated blister pack filling system, the steps relating to a pill-detection sequence, according to a possible embodiment.
Figure 7B:
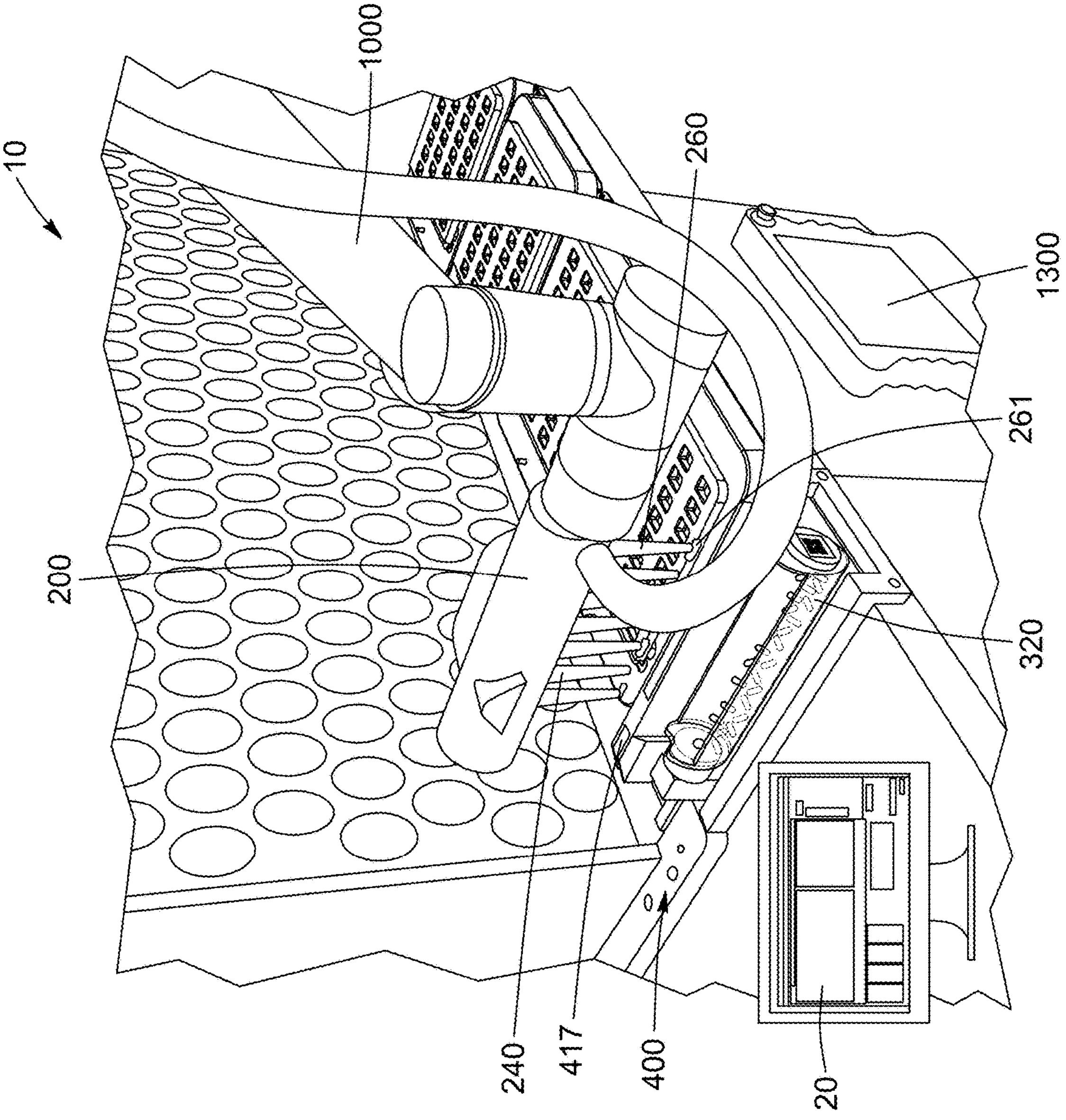
FIG. 7B is a side view of the automated blister pack filling system, the vacuum pill-manipulator being in a pill-retaining configuration, and the system performing the pill detection sequence of FIG. 7A.

As for the pill-containers, they are shaped to fit within the drawers and have an open top side that allows inserting and removing pills therefrom. In some embodiments, such as the one illustrated in FIG. 6, the pill-container has an ovoid cylindrical shape, but other shapes and configurations are possible. The pill-containers may also be transparent, in order to see the quantity and the type of pills stored within (as illustrated in FIG. 1). Each pill-container can be provided with pill-container coupling 322 made of a ferromagnetic element. A first pill-container coupling **322*a* can be provided to allow the pill-container to be held, while it is retrieved by the vacuum pill-manipulator 200 and moved toward and/or from the pill-filling station. A second pill-container coupling 322*b* may also be provided to allow the pill-container 320 to be deposited and retained in place, allowing the pills to be suctioned by the vacuum pill-manipulator 200 (as illustrated in FIG. 7B). Furthermore, the pill-container can be provided with a QR code corresponding to the type of pills inside the pill-container 320. It should be understood, however, that in some embodiments, other identification codes can be used, such as barcodes 324**, Aztec Codes, NFC tags, and the likes.

Still referring to FIGS. 5 and 6, but also to FIG. 1, according to some embodiments, upon receiving a prescription instruction, i.e., instructions to fill a blister pack based on the information found in a prescription, the robotized arm 1000 positions the vacuum pill-manipulator 200 in front of the corresponding pill-container 320. The barcode reader 220 scans the QR code on the pill-container 300 and sends the information to the computer 20 to confirm that the pills in the pill-container match the prescription being executed. Once confirmed, the vacuum pill-manipulator 200 can retrieve the pill-container 320 and move it to the pill-container retaining station 400 (shown in FIG. 1 and also in FIG. 7B). In some embodiments, the vacuum pill-manipulator is provided with a manipulator-coupling 230. The manipulator-coupling can be adapted to connect to the pill-container coupling 322 to retrieved said pill-container 320 from the pill-container rack and to bring it to the pill-container 320 retaining station 400. As it can be appreciated, the manipulator-coupling 230 can be adapted to electromagnetically connect to the pill-container couplings 322 of the pill-containers 320, i.e., the electromagnet of the vacuum-pill manipulator can be adapted to connect with the ferromagnetic element of a pill-container.

Referring to FIG. 7B, a possible embodiment of the filling system 10, in which the pills are detected before filling, is illustrated. FIG. 7A shows a flow chart of possible steps of the method which further includes grabbing and detecting the pills 60 prior to filling the blister pack. Along with the previously described elements of FIGS. 1 to 4, the filling system comprises the pill-container retaining station 400. In some embodiments, once the pill-container 320 is placed at the pill-container retaining station 400, the computer 20 controls the vacuum pump 1400 so that pills are suctioned at the open-ended tips 261 of the prongs 260 of the vacuum pill-manipulator 200 (step 62 of FIG. 7A). To do this, the vacuum pill-manipulator 200 is positioned above the pill-container 320, so that the prongs face the top/open side of the container 320. The vacuum pill-manipulator 200 is then lowered rapidly, until the prongs 260 reach a predetermined height of the pills within the pill-container 320 (which can be pre-defined). After reaching the predetermined height, the vacuum pill-manipulator 200 is lowered slowly until the open-ended tips of the prongs 260 are in contact with the pills.

In some embodiments, upon positioning the prongs 260 within the pill-container 320, suction is applied to ensure that at least one pill is retained. Thereafter, depending on the type of pill to be retained by each prong 260, the level of suction is gradually reduced until a desired suction level is reached. The desired suction level is pre-configured so that only one pill of the selected type is retained by each prong 260. Therefore, if more than one pill is retained at the end of a prong (i.e., the open-ended tip of the prong), gradually lowering the suction level ensures that excess pills are not retained at the open-ended tips 261 and are dropped back within the pill-container 320. The prongs 260 of the vacuum pill-container 200 can be moved to enter within the container along a curved path, rather than simply lowered vertically within the container. It has been found that lowering the vacuum pill-manipulator 200 slightly at an angle, along a curved path, when positioning the prongs within the pill-container helps to better suction the pills at the open-ended tips 261 of the prongs 260 and helps in having pills retained at the open-ended tip of each prong. Further, the angle of which the vacuum pill-manipulator 200 enters the pill-container 320 is, each time, opposite to the angle of the previous entry. In addition to changing the angle of entry, the vacuum pill-manipulator 200 does a forward or backward movement, along the longitudinal axis of the pill-container 320, to push the pills to both ends. The forward or backward movement, alternates depending on the current entry angle. The alternating angle of entry and the forward/backward movement ensures that the pills are spread evenly within the pill-container 320 and prevent the filling system 10 from wrongly detecting that the pill-container 320 is empty.

In some embodiments, a load cell 412 (identified at FIG. 8A) can be included with the pill-container retaining station 400. The weight of the pill-container 320 can be measured by the load cell 412 and provided to a controller or to the computer 20 to indicate whether there are enough pills remaining in the pill-container 320. The controller or computer can then trigger a signal to stop the system's 10 operation, i.e., the robotized arm will stop moving, and a technician can refill the container with new pills. In some embodiments, the controller or computer triggered signal can be transmitted to the medication dispensing system application. Alternatively, the system 10, can put aside the pill-container and resume its operation, while the technician refills the container. An alarm can be triggered and displayed on the computer (or any other device in communication to the system) to inform a technician that more pills must be poured in a container.

Once pills are suctioned/retained at the open-ended tips 261 of the prongs 260, the robotized arm 1000 aligns the vacuum pill-manipulator 200 with a plurality of corresponding photo-resisting sensors 417 provided at the pill-container retaining station 400, such that the photo-resisting sensors 417 are positioned to detect light from a corresponding light emitter. The photo-resisting sensors 417 are photoresistors which measure the intensity of the vacuum pill-manipulator 200 light transmitters 240. Accordingly, once the pills have been suctioned at the open-ended tips of the prongs, and once each prong 260 is aligned with a corresponding photo-resisting sensor 417, the light transmitters are turned on, emitting light at the open-ended tips of the prongs (step 64 of FIG. 7A). The photo-resisting sensors may then detect the pills at the open-ended tips of the prongs. As better shown by FIGS. 7B and 8A, if a pill is properly suctioned at the open-ended tip of a prong, the pill will prevent the emitted light from reaching the corresponding photo-resisting sensor 417. Thus, the photo-resisting sensor 417 provides an indication of the presence of a pill (detects presence of pills) at a corresponding prong (step 66 of FIG. 7A). Of course, the light transmitters 240 can be turned on prior to suctioning the pills. What is needed is that light be turned on within the prongs 260 and that the retained pills are positioned above the photo-resisting sensors 417.

Depending on whether the photo-resisting sensors 417 receive a light emission, the "pill-retaining status" of each prong can be determined by sending a corresponding signal a controller. The pill-retaining status may correspond to the presence or not of a pill held at the open-ended tip of a prong. For example, a low-intensity signal or no signal at all will suggest that a pill is held at a prong, since the pill will block light exiting the prong from activating the photosensor. Alternatively, a strong intensity signal is generated when light goes directly to the photo-resisting sensor, without being blocked, confirming that no pill is held at the prong. The controller may be the same controller 1300 which operates the robotized arm and the vacuum pill-manipulator 200 or a different microcontroller provided directly at the pill-container retaining station 400. Upon receiving the signal from the photo-resisting sensors, one for each prong 260, the controller will send the pill-retaining statuses to the computer 20. In particular, the pill-retaining statuses will be sent to the medical dispensing system application 500 stored on the computer 20 (step 68 of FIG. 7A).

In another possible embodiment, prior to suctioning the pill at the open-ended tips of the prongs (step 62), a validation step may be provided (step 61 of FIG. 7A). The validation step is similar to the above-mentioned steps, namely the emission of light at the open-ended tips of the prongs (step 64); the detection of light at the open-ended tips of the prongs (step 66); and the sending of the signal of the pill-retaining status to the medication dispensing system application (step 68). The validation step (step 61) is intended to validate the absence of pills at the open-ended tips 261 of the prongs 260 and the proper functioning of the light transmitters 240. Notably, to pass the validation step (step 61), each photo-resisting sensor 417 must receive light emitted from a corresponding light transmitter 240. Thus, when the controller receives and sends a pill-retaining status from all the photo-resisting sensors 417, indicating the absence of pills retained at the open-ended tips of the prongs, the medical dispensing system application 500 can infer that there are no pills clogging the open-ended tips 261 of the prongs 260 and the light transmitters are functioning properly. Once the validation step is successful, the system 10 can move forward to the filling step, as intended. Otherwise, if one of the photo-resisting sensors 417 sends a pill-retaining status indicating that a pill is retained, the robotized arm 1000 may receive instructions to move the vacuum pill-manipulator 200 in a way as to remove the clogged pill(s). Alternatively, instructions can be sent to the robotized arm 1000 to stop moving and a notification can be sent to a technician or a pharmacist, indicating an error in the validation step.

As per the flow chart provided in FIG. 7A, according to a possible embodiment, the computer's running the medical dispensing system application 500 (identified in FIG. 14) can further compare the current pill-retaining status of each prong with information received from a given prescription instruction originating from an electronic prescription (e.g., instructions received from a prescription file). If the pill-retaining status does not match with the information's in the electronic prescription, the medical dispensing system application 500 may send instructions to remove extra pills from at least some of the prongs (step 69 of FIG. 7A). In another embodiment, during the validation process the medical dispensing system application 500 (shown in FIG. 14) may also determine, from the information's in the electronic prescription, if some prongs should be cleared of pills during the filling process (sub-step 61A of FIG. 7A). For example, the vacuum pill-manipulator 200 may be provided with seven prongs 260 to hold seven pills at a time, with one pill per prong. However, the electronic prescription indicates that only the first, third and seventh prong must retain a pill. The extra pills on the remaining prongs must therefore be removed. To remove extra pills, the vacuum pill-manipulator may be positioned so that the prong with the extra pill is first positioned inside the pill-container. The vacuum pill-manipulator can thus be moved along the longitudinal axis of the pill-container so that the prong touches a surface of the pill-container 320, such as sidewall 321 (identified in FIG. 6). By touching the top edge of the sidewall 321, the pill falls into the pill-container. In other words, by slightly brushing or scraping an extra pill against the top edge of sidewall 321 of the container, the extra pill is removed from the prong and placed back into the pill-container. The process can be repeated for the other extra pills retained at the open-ended tips of the other prongs. The top edge of the sidewall 321 of the pill-container can be determined beforehand, from the medical dispensing system application 500, by measuring the position of the robotized arm 1000 when the prongs 260 are in contact with the pills within the pill-container 320 (sub-step 61B of FIG. 7A).

Figure 8B:
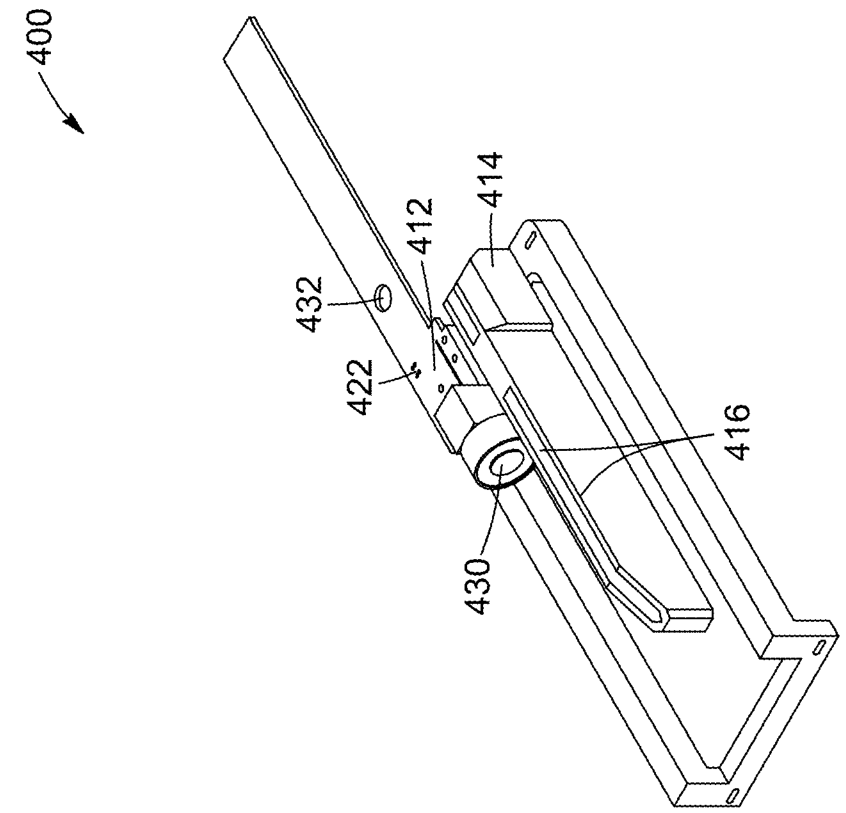
FIG. 8B is a perspective view of the pill-container retaining station of FIG. 8A.
Figure 8A:
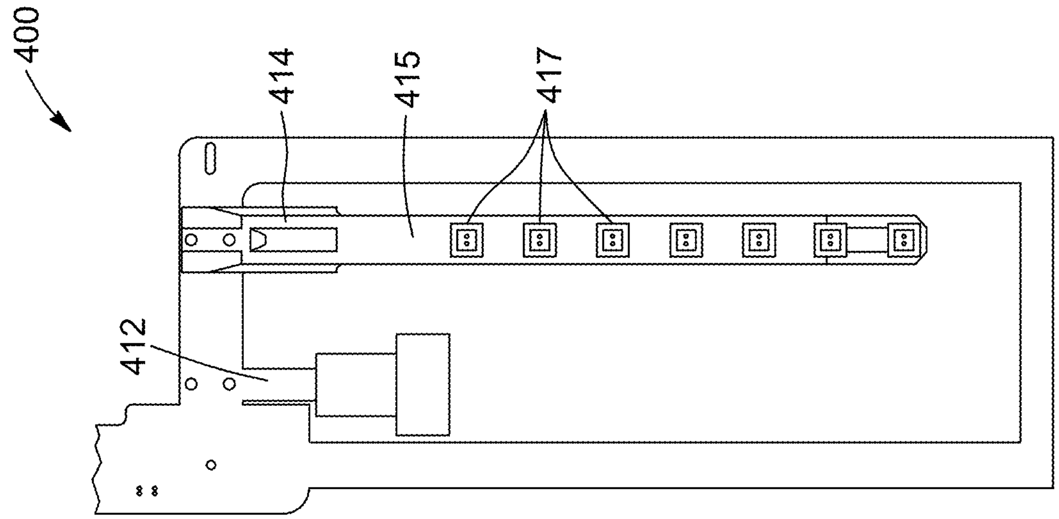
FIG. 8A is a top plan view of a pill-container retaining station, according to a possible embodiment.
Figure 8C:
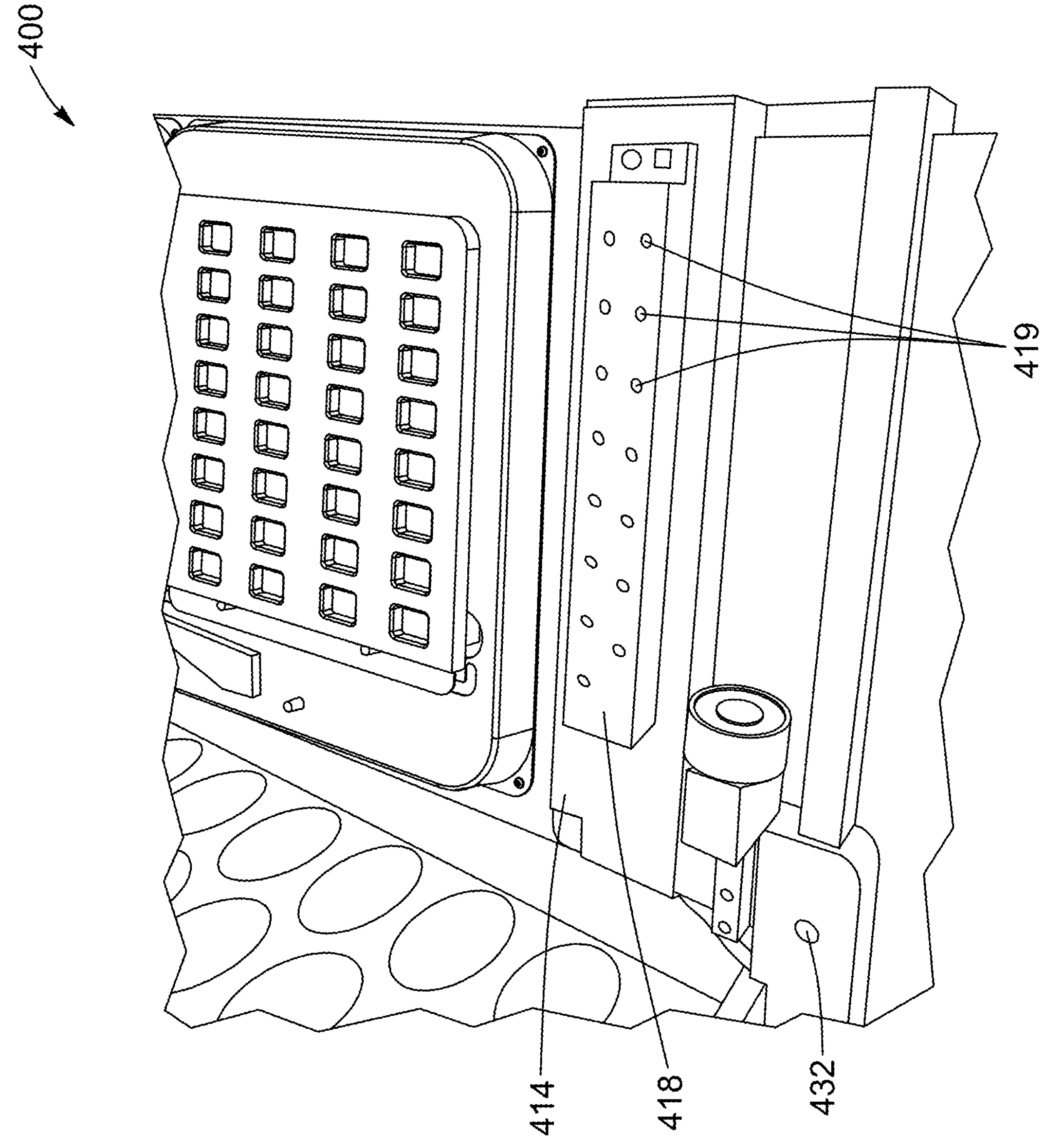
FIG. 8C is a perspective view of the pill-container retaining station of FIG. 8A, showing a photo resisting sensor holder with an alternate configuration, according to a possible embodiment.

Now referring to FIGS. 8A to 8C, the pill-container retaining station 400 can be further provided with a station-coupling 430 and a photo-resisting sensor holder 414. The station-coupling 430 can connect to a pill-container coupling 322 of a pill-container 320. The pill-container can thus be retained in place, while the pills are suctioned by the vacuum pill-manipulator 200. In some embodiments, the station-coupling 430 can include an electromagnet adapted to electromagnetically connect with the pill-container coupling's 322 ferromagnetic element. The station-coupling 430 may also connect to the load cell 412, which allows to measure the weight of the pill-container (as previously mentioned), as well as the force applied when the prongs of the vacuum pill-manipulator 200 are in contact with the pills or with the top edge of the sidewall of the pill-container. More precisely, the load cell 412 allows to measure an initial weight which comprises the weight of the pills within the pill-container. This information allows to predetermine the height to which the prongs are lowered when the vacuum pill-manipulator enters the pill-container. The load cell 412 also detects the contact of the prongs with the pills by detecting the excess weight, generated by the force of the prongs in contact with the pills or the top edge of the sidewall. The pill-container retaining station may also include a toggle button 432 to manually turn on/off the station-coupling 430, i.e., the electromagnet. As previously mentioned, upon detecting that there are not enough pills in the pill-container, the robotized arm 1000 can stop and wait for a refill. During that time, a technician, for example, can turn off the station-coupling, refill or replace the pill-container, and turn it back on again. A coupling-state interface 422 may also be provided to indicate to the user when the station-coupling is turned on. The coupling-state interface 422 can be a light that turns on when the electromagnet is activated, or a distinct sound can be played when turned on/off.

The photo-resisting holder 414 may comprise a bottom wall 415 and sidewalls 416. The photo-resisting sensors 417 may be aligned, each at an equal distance, on the bottom wall 415. The sidewalls may surround the photo-resisting sensors, in such a way that they are protected from external sources of lights. Therefore, the sidewalls 416 are high enough to block the ambient light, but still allow the light emitted from the light transmitters 240 to reach the photo-resisting sensors 417.

In another embodiment, such as the one illustrated in FIG. 8C, the photo-resisting holder 414 can further include a covering panel 418. The covering panel 418 is provided with a plurality of openings 419, where each opening is aligned with a corresponding photo-resisting sensor 417. As it can be appreciated, the covering panel 418 can block the external sources of lights, while allowing the photo-resisting sensors 417 to detect the lights of the light transmitters 240. Namely, when the vacuum pill-manipulator 200 is positioned, over the photo-resisting holder, each prong 260 covers a corresponding opening 419. Thus, the light passing through the opening 419 can only be the one emitted by a light transmitter 240 which is directly aligned with a photo-resisting sensor 417.

The load cell 412 connected to the station-coupling 430 and the photo-resisting sensors 417 may be connected to two separate microcontrollers (not shown). Both microcontrollers may be further provided with Bluetooth adapters and communicate wirelessly with the computer 20 and/or the controller. Thus, the microcontroller connected to the load cell 412 may receive instruction regarding the adjustment of the station-coupling 430, i.e., the adjustment of the electromagnet electromagnetic force. The microcontroller connected to the load cell 412 may also receive instruction to remotely toggle the station-coupling 430 state (similar to the toggle button). Furthermore, the microcontroller connected to the load cell 412 may also provide to the computer data about the measured weight of the pills within the pill-container, based on the measured weight of the load cell 412, and notify the computer when a change in weight occurs (i.e., the prongs of the vacuum pill-manipulator are in contact with the pills or the edge of sidewalls). As for the microcontroller connected to the photo-resisting sensors 417, it may be configured to transfer the signal, corresponding to the pill-retaining status of each prong, to the controller and/or the computer (i.e., processing device).

Figure 9A:
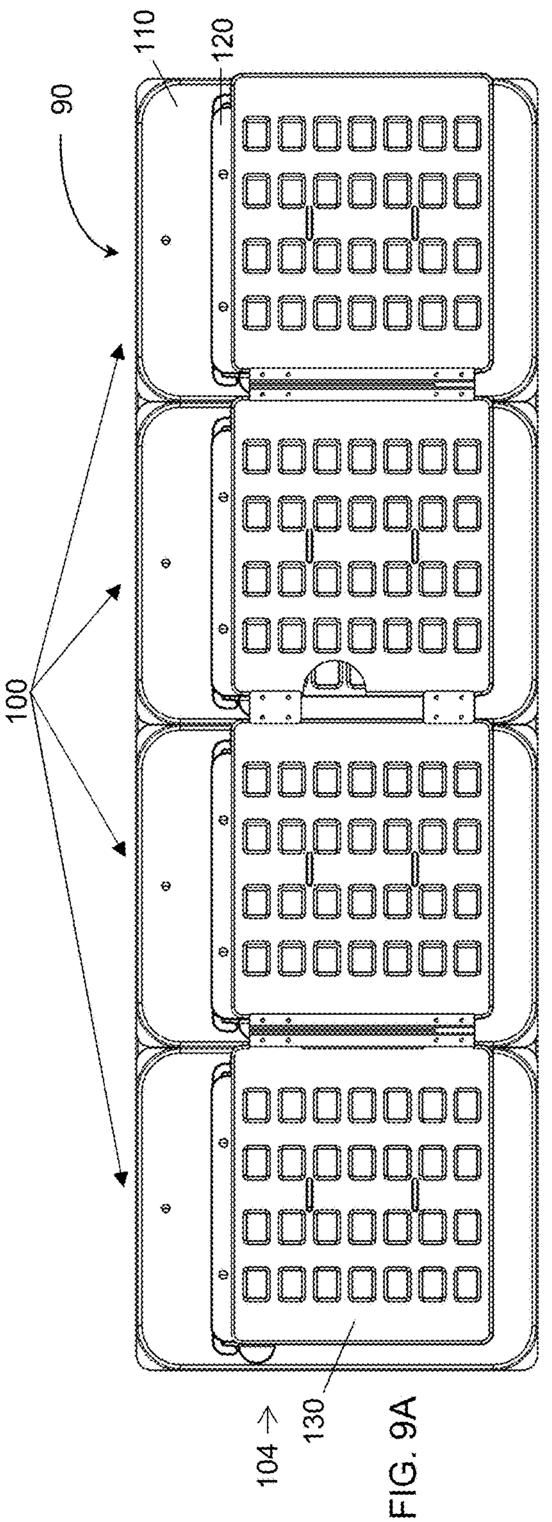
FIG. 9A is a top plan view of several tray assemblies for filling pills into a blister pack, according to a possible embodiment.
Figure 9B:
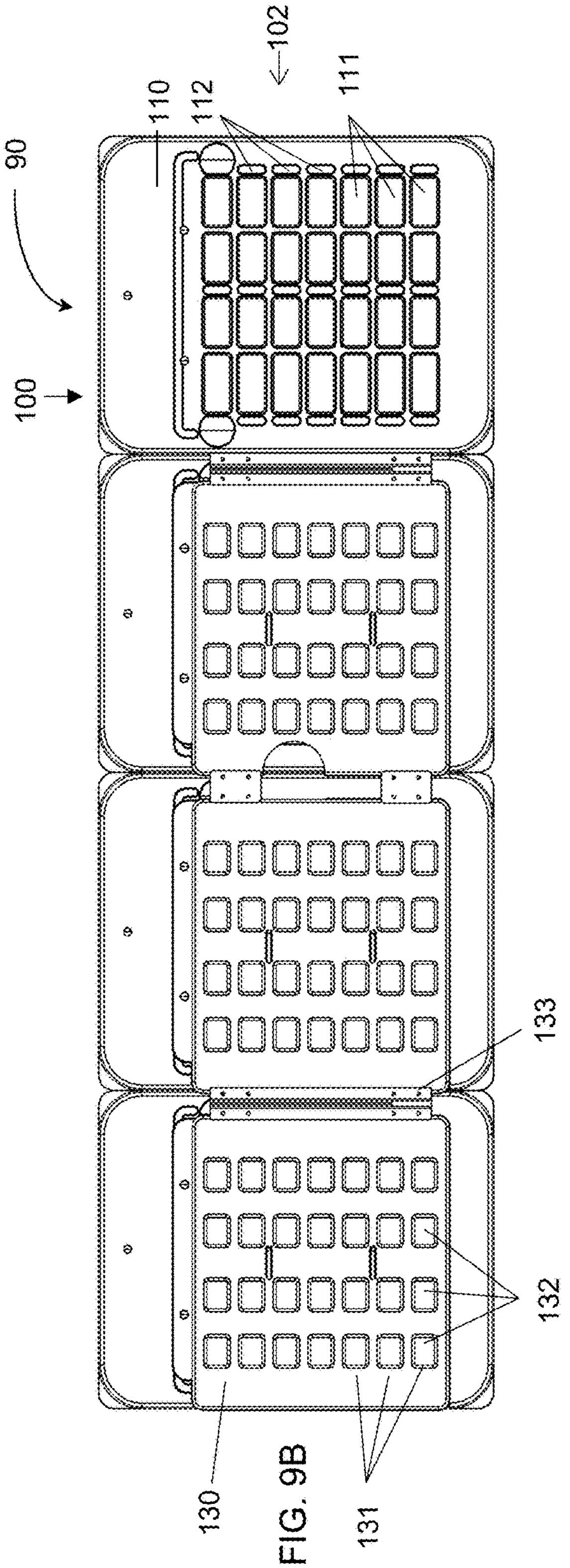
FIG. 9B is a top plan view of the several tray assemblies of FIG. 9A, with one tray assembly only being provided with a mounting tray.
Figure 9C:
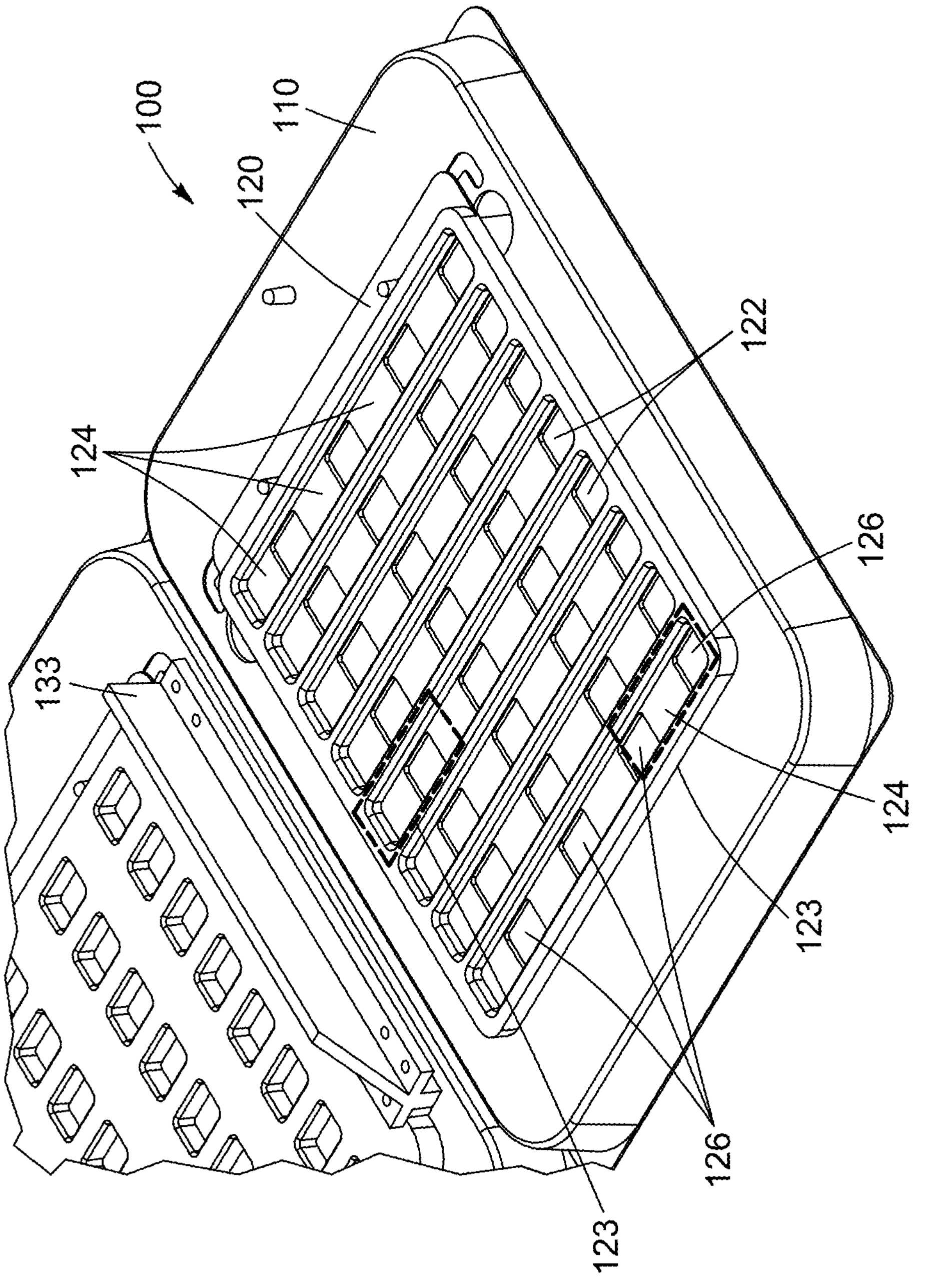
FIG. 9C is a perspective view of two tray assemblies of FIG. 9A, with one tray assembly only being provided with the mounting tray and a depositing plate.

Referring to FIGS. 9A to 9C, the system 10 can further include a tray assembly 100 for filling the pills into one or more blister packs 80. The tray assembly 100 may comprise several tray assemblies 90 connected next to each other. The tray assembly 100 is provided with a mounting tray 110, which is provided with rows 111 of multiple recesses 112. The mounting tray is shaped and configured to allow support for the blister pack 80, so as to fit the pill-chambers 81 into corresponding recesses 112. In the present embodiment, the mounting tray recesses 112 are open at both ends, but other configurations may include a bottom surface. In some embodiments, the blister pack is supported on top of the mounting tray and each pill-chamber are fitted within a corresponding recess of the mounting tray.

In the illustrated embodiment, the tray assembly 100 is fitted to support a blister pack 80 with four columns and seven rows, corresponding to seven days and four intake intervals (morning, noon, evening, and bedtime). In other embodiments, the tray assembly 100 may be shaped as to support other types of packaging's, such as a monthly format with thirty pill-chambers 81, as examples only.

The tray assembly 100 can further include a depositing plate 120 and a sliding tray 130. The depositing plate 120 is placed over the mounting tray 110 and is provided with depositing-plate rows 122. The depositing-plate rows 122 face the rows 111 of the mounting tray 110. Each depositing-plate row comprises pairs 123 of pill-drop surfaces 124 and pill-holes 126 (best shown in FIGS. 9C, with the sliding tray removed), aligned side-by side with one another (i.e., the pill-drop surfaces may also be referred to as depositing surfaces or pill-depositing surfaces). The pill-drop surface 124 may correspond to a flat surface on which a pill can be dropped by the vacuum pill-manipulator. The pill-hole 126 may correspond to a hole to allow the pill to fall inside the blister pack pill-chamber 81, positioned underneath the depositing plate 120, and over the mounting tray 110. The pill-hole 126 of each pair 123 faces a corresponding pill-chamber 81 of the blister pack. In some embodiments, the depositing plate 120 is placed over the mounting tray 110 and aligned so that each pair 123 faces a corresponding pill-chamber 81. In possible embodiments, the recesses of the mounting tray 110 have a greater size than the sizes of the depositing plate 120 pill-holes 126. In other possible embodiments, the recesses may at least be of the same size as the depositing plate 120 pill-holes 126.

The sliding tray 130 is placed over the depositing plate 120 and comprises sliding-tray rows 131, which are provided with open cavities 132. Typically, a cavity is a hole through which pills can pass when dropped. The sliding tray 130 can slide over the depositing plate. When the open cavities 132 are facing the pill-drop surfaces 124 of the depositing-plate, the sliding tray is in a pill-drop position 102 (as shown in FIG. 9B). As such, a pill can be dropped onto the pill-drop surface 124. When the opened cavities 132 are facing the pill-holes 126 of the depositing plate 120, the sliding tray 130 is in a chamber-filling position 104. When moving the sliding tray 130 laterally from the pill-drop position to the chamber-filling position, the pills are pushed from the pill-drop surface 124 of the depositing plate to the pill-chambers 81 of the blister pack 80. As a result of moving the sliding tray, pills can be dropped into the corresponding pill-chamber 81 of the blister pack 80.

The tray assembly 100 can further include a push plate or flange 133 to move the sliding tray from the pill-drop position 102 to the chamber filling position 104. For example, once the vacuum pill-manipulator 200 has deposited the pills on the pill-drop surfaces 124, the vacuum pill-manipulator 200 can, using the prongs or the manipulator-coupling connected thereto, push on the flange 133 to push the pills to the pill-chambers of the blister pack. In other words, once the pills are dropped at the right locations on the tray assembly 100, either a technician or the robotized arm 1000 can push on the push plate 133 to move the sliding tray 130 to the chamber filling-position and fill the pill-chambers of the blister packs accordingly. Once the pill-chambers are filled, the individual or the robotized arm can push back on the push plate to move the sliding tray back to the pill-drop position. It is useful to provide the tray assembly with the pill-drop surfaces 124 and the pill-holes 126 so that the pills can first be counted or verified before being dropped in the blister pack. Since the blister pack 80 can be filled based on several prescriptions, the tray assembly 100 allows to verify each individual prescription during the filling process. If the pills were to be dropped each time within the pill-chambers, without being first drop on the pill-drop surfaces 124, it would not be possible to ascertain that each filling-instruction associated to a given pill or medicine type has been properly executed. As will be explained in more detail below, images of the different filling step relating to the execution of an electronic prescription (i.e., a prescription file) are taken to ensure that the filling process is properly executed.

Once the tray assembly 100 is set and ready for use, the sliding tray 130 is placed by default in the pill-drop position 102. The pills are then dropped onto the pill-drop surfaces 124 of the depositing plate 120. The placement and dropping steps can be performed by the robotized arm with a vacuum pill-manipulator connected to it. Typically, the robotized arm positions himself over a sliding tray 130 column of the sliding tray and the vacuum pill-manipulator releases the retained pills into the corresponding opened cavities 132.

Then, once the pills have been dropped on the pill-drop surfaces, a camera, used for verification purposes, takes images/pictures of each individual sliding tray 130, depositing plate 120, and/or entire tray assembly 100 or tray assemblies 90. The camera can be for example the web camera provided on the vacuum pill-manipulator 200. The camera can therefore take a picture (such as the ones on the depositing plates 124) and keep a record of each type of individual pill contained in the blister pack, since they have been tracked/imaged at each step of the filling process. If needed, a professional can later compare the images captured by the camera and identify any discrepancies between the pills on the sliding tray and the information's in the electronic prescription. In possible embodiments, this comparison can be performed with a dedicated software recognition/inspection system, using trained AI algorithms, for example.

Once the images/pictures are taken, the sliding tray is moved by the vacuum pill-manipulator 200, from the pill-drop position 102 to the chamber-filling position 104: the pills are thus pushed into the pill-chambers 81 of the blister pack 80.

Moreover, the plastic of the depositing plate may have elastic or damping properties selected to avoid or limit bouncing of the pills when dropped onto the pill-drop surfaces 124. Thus, the pills do not bounce out of the cavities 132 of the sliding tray 130 when deposited on the pill-drop surfaces 124 of the depositing plate 120. More particularly, the pill-drop surfaces are flat and rigid. In combination with the close distance of the prongs 260 of the vacuum pill-manipulator 200, pills that fall onto the pill-drop surfaces 124 do not have enough rebound to exit the cavities 132.

Figure 10:
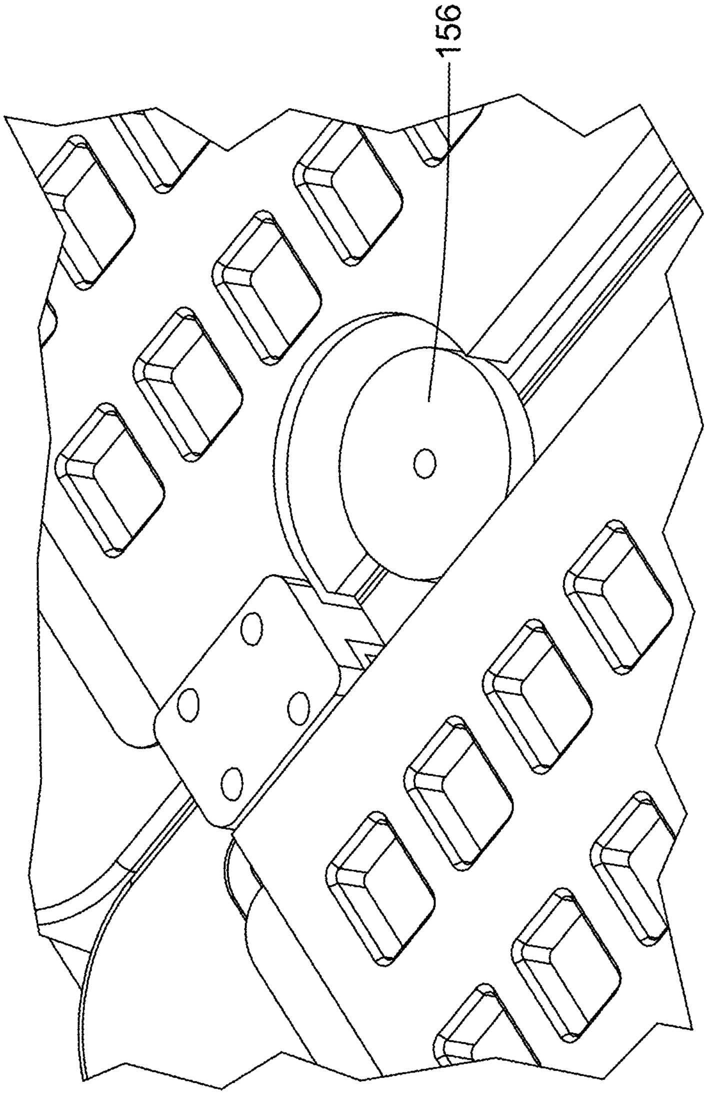
FIG. 10 is a close-up view of two tray assemblies, wherein a tray-coupling is provided therebetween, according to a possible embodiment.

Now referring to FIG. 10, a tray-coupling 156, can be provided to connect the tray assembly to the robotized arm 1000 (illustrated in FIG. 1). The tray-coupling can allow the robotized arm to move the tray assembly from one location to another. In some embodiments, once the filling of all the prescriptions for a patient is completed, the robotized arm 1000 can transport the tray assembly 100 to a stacking station (not shown) where a professional can pick the tray assembly 100 to perform further verification, manually fill exceptions related to the prescription, or simply remove the blister packs 80 (FIG. 13) from the tray.

In some embodiments, the tray-coupling 156, can also include a ferromagnetic element or a handle. The tray-coupling can be provided on or between two tray assemblies 90. The tray-coupling can then be connected to the robotized arm 1000. For instance, the tray coupling 156 can be adapted to connect with the manipulator-coupling of the vacuum pill-manipulator, allowing the robotized arm to move the tray assembly (or tray assemblies) from the filling station to the stacking station. In some embodiments, the tray-coupling 156 can be a ferromagnetic disk adapted to electromagnetically connect with the electromagnet included with the manipulator-coupling. The coupling can also be achieved by suction, such as a suction pump, that can apply suction on the surface of the tray-coupling 156 to connect thereon. The suction pump can be provided on or near the robotized arm 1000.

In some other embodiments, the robotized arm 1000 can be provided with a hook/handle arrangement, where a mechanical hook or a gripper is connected to the robotized arm 1000 (i.e., attached at the end of the vacuum pill-manipulator, for example) for it to grab the handle provided on the tray assemblies 90. In all cases, the robotized arm 1000 can then move the tray assemblies 90 to another location, such as the stacking station.

Figure 11:
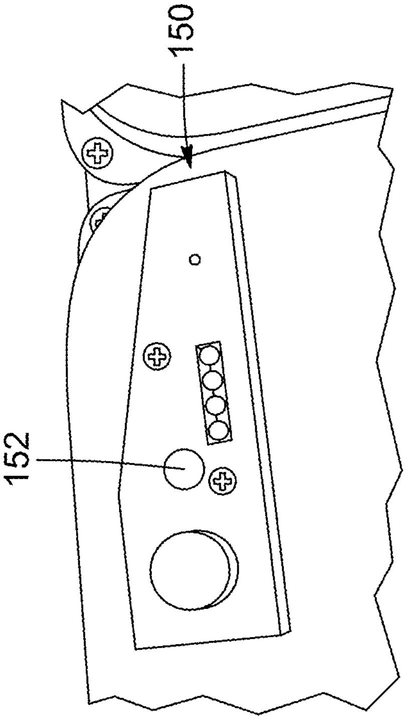
FIG. 11 is a close-up view of a portion of a tray assembly, wherein the tray assembly is provided with a status interface including of status lights to display a battery status and a wireless communication module status, according to a possible embodiment.

Referring to FIG. 11, the tray system can further comprise a microcontroller 140 and a wireless communication module (although, it should be noted that in some embodiments, the communication module can be wired instead). A rechargeable battery is also included in the system to power both the microcontroller 140 and the wireless communication module. According to the present embodiment, the wireless communication module is a Bluetooth device, but may be replaced by a Wi-Fi adapter or other data transmission adapters. The microcontroller can receive wirelessly external instructions, coming from a computer or a remote controller, indicating the position of the pills in the blister pack. The tray system may also include a status interface 150, positioned on top of the mounting tray. The status interface comprises status lights 152 to indicate the status of the communication device and the battery. An on and off switch may also be provided to the status interface to toggle the status communication device.

Figure 14:
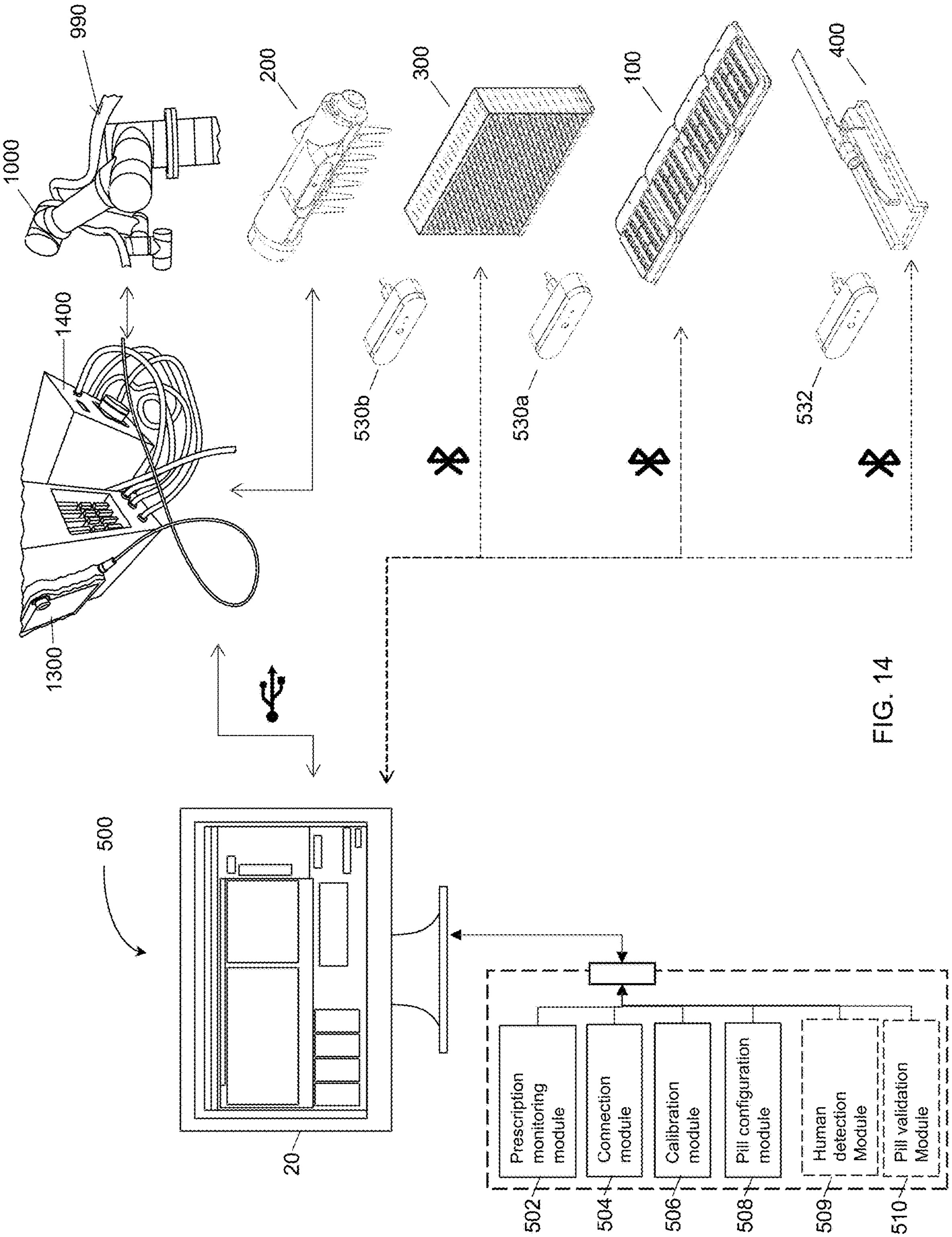
FIG. 14 is a schematic illustration of a medication dispensing system application and of interactions thereof with the system components, according to a possible embodiment.

Now referring to FIG. 14, the filling system 10 as a whole or its individual components, may be in communication with a computer 20. The computer 20 may be a desktop computer, a server or a server's cluster. The computer may include one or more Bluetooth adapters and/or a Wi-Fi antenna to transmit data to the system components.

According to a possible embodiment, a medication dispensing system application 500 may be provided along with the processing device 20 (or computer). The medication dispensing system application can be configured to control and/or collaborate with the collaborative robot 990 and the vacuum pump 1400 based on instructions derived from electronic prescriptions. To do so, the medication dispensing system application can include a prescription monitoring module 502, a connection module 504, a calibration module 506, and a pill configuration module 508.

The prescription monitoring module 502 monitors whether new electronic prescriptions are available. Typically, electronic prescriptions come in the form of a prescription file, such as a data file (.dat file extension). As previously explained, the prescription file may come in from of an XML or JSON format to name only a few alternatives. The prescription file is generated from a distribution pill application (not shown). Once the professional selects a prescription from a list, a representation of the client's blister pack is displayed on an interface. Upon confirmation by the professional, namely selecting the prescription and validating his choice, the prescription file is generated. The prescription file may contain information regarding the different components of the system 10. Notably, the prescription file may contain: the position of the pill-container rack 300 drawer 310, corresponding to the given prescription; the barcode 324 number associated with the pill-container 320; a task identification number; and a numeral representation of the pill-chambers 81 of the blister pack 80, along with a referral number corresponding to the number of pills required within each one of said pill-chambers (ex. [1][0][1][0][2]). Once generated, the prescription file monitoring module may then fetch the new prescription file, either locally on the computer or remotely on another computing device. The prescription file monitoring module may alternatively monitor a remote partition or a file server with the use of an FTP (File Transfer Protocol) client, as examples only.

The prescription monitoring module 502 can then interpret the data from the monitored electronic prescription (i.e., the prescription file) and send the relevant instructions, in the form of prescription instructions, to the corresponding component. For example, instructions related to the movements of the robotized arm 1000 can be sent to the robotic arm controller 1300 to allow the robotized arm 1000 to be positioned in front of the drawer of the pill-container rack 300 holding the pill-container corresponding to the electronic prescription, and connect to the pill-container to subsequently perform the steps of the filling process.

In possible embodiments, the electronic prescriptions can include other elements than a prescription file. As an example, the prescription file monitoring module 502 can act as a web server or web listener. Once a new prescription is generated, an HTTP request, containing the electronic prescriptions, may be sent from an external source to the prescription monitoring module.

Figure 15:
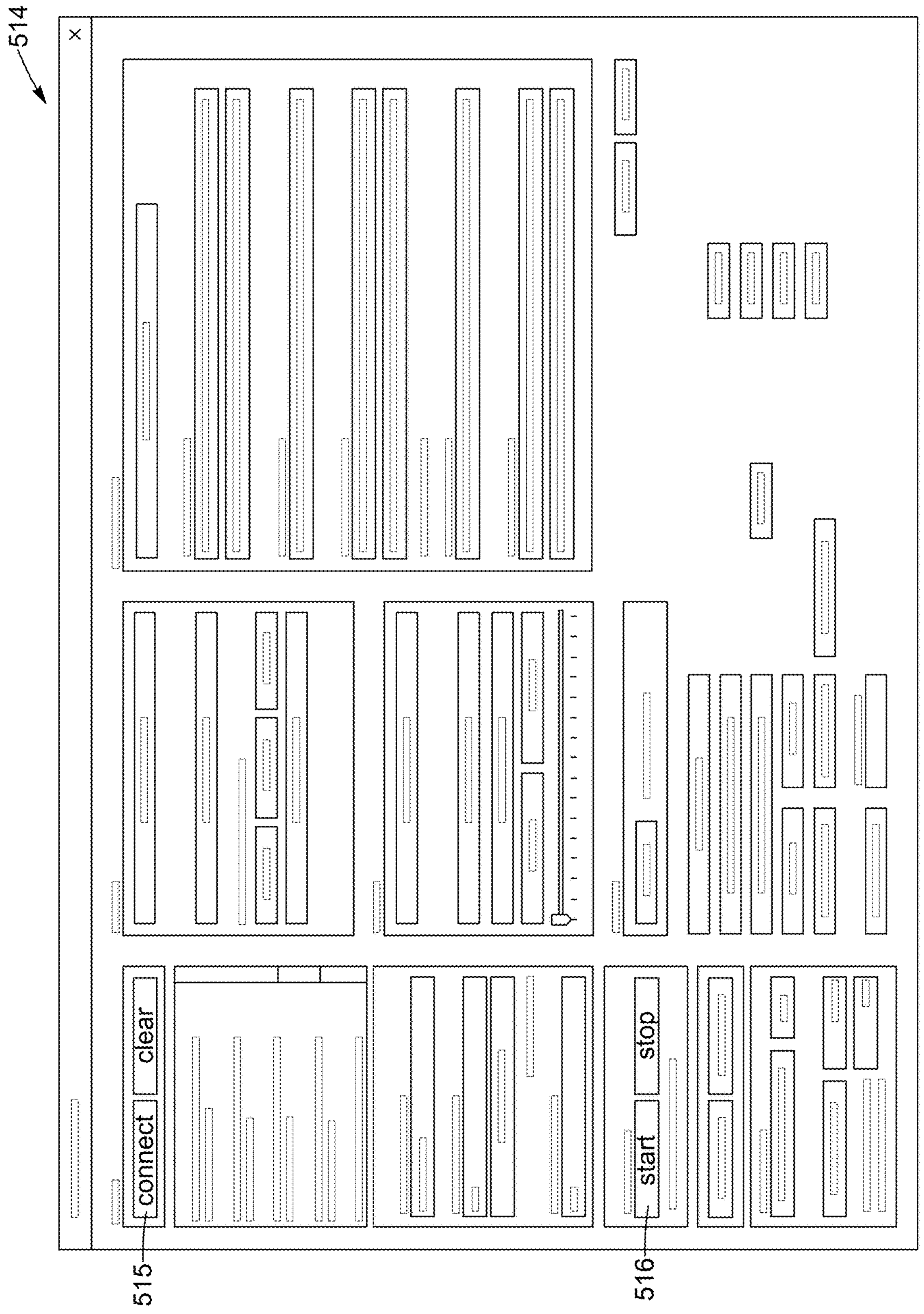
FIG. 15 shows a possible embodiment of a graphical user interface, in which settings to connect to the system components are displayed, along with an option to monitor electronic prescriptions, according to a possible embodiment.

The connection module 504 allows the application 500 to connect to the robotic arm controller 1300, which controls the robotized arm 1000. The connection module also allows connecting the different components of the system such as the vacuum pump 1400, the pill-container rack 300 light indicators, the pill-container retaining station's 400 load cell, and the vacuum pill-manipulator 200 components (barcode scanner, electromagnet, and light transmitters). Notably, the connection module can activate the adapters of the computer (either the one or more Bluetooth adapter or Wi-Fi antenna) and pair with the various component's adapters. For example, the connection module may activate one of the computer's Bluetooth adapter to pair with the Bluetooth adapter corresponding to the pill-container retaining station microcontroller. As illustrated in FIG. 15, the medication dispensing system application comprises a connection or graphical user interface 505. The connection interface 514 allows a professional to manually connect with the various components mentioned above. Notably, the professional can press the connection button 515 to initiate the connection module and thus activate the device's adapters. The connection interface 514 may also comprise a monitoring button 516. The monitoring button will initiate the pill monitoring module 502, which will begin monitoring for new prescription instructions.

Figure 16:
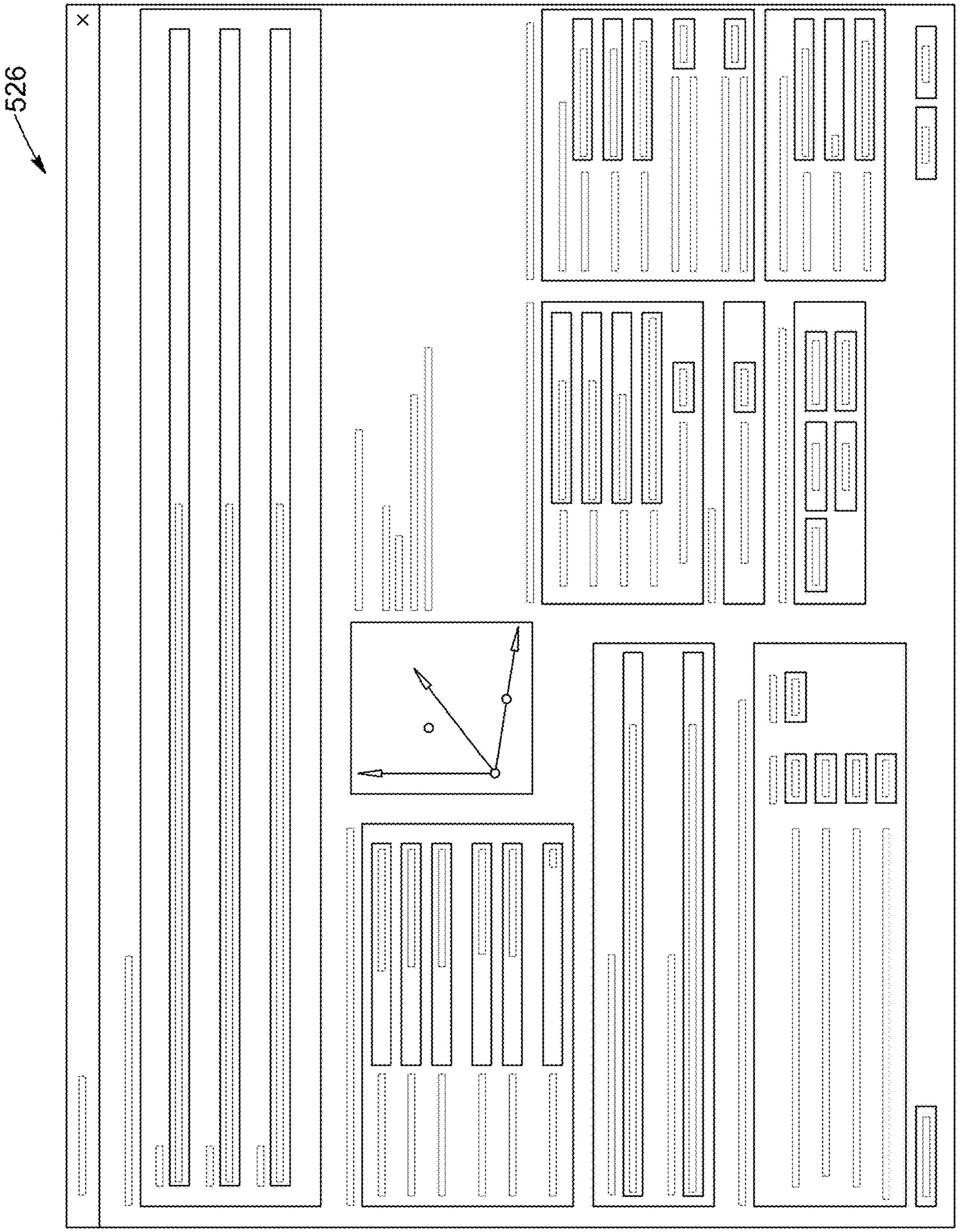
FIG. 16 shows another possible embodiment of a graphical user interface, in which settings to calibrate the system components are displayed.

The calibration module 506 defines the distances between the different components in order to ensure the appropriate positioning of the robotized arm 1000 at each stage of the filling process. Before using the system 10, a system technician must set up the components at the pill-filling station 11, thus roughly putting them in place. For the system to work properly, the components must be aligned with each other, i.e., the robotic arm must be at an appropriate distance from the pill-container rack 300, the tray system 100 must be well centered on the pill-filing station 11, etc. The system technician must then calibrate the system components to make it work properly. As illustrated on FIG. 16, the medication dispensing system application 500 further comprises a user calibration interface 526 to interact with the calibration module. The user calibration interface 526 allows the technician to modify the positioning of the components, by adjusting their coordinates. The calibration module can thus infer the moving distances of the robotized arm with respect to the components that surround it. It will be further appreciated that with the calibration module, it takes roughly twenty minutes for the system to be operational.

Referring back to FIG. 14, the pill configuration module 508 directly handles pill management. In particular, the pill configuration module can include suction level instructions for the vacuum pump 1400, based on a given type of pill. Typically, based on the given prescription instructions, the pill configuration module determines the appropriate level of suction to apply to properly retain the pill during the filling process, and send his instructions to the vacuum pump so the suction level can be adjusted accordingly. Moreover, the pill configuration module 508 can determine the volume of pills remaining within the pill-container, based on a stored value of the density of an individual pill and the measured weight provided by the load cell.

According to a possible embodiment, the filling system 10 can further comprise at least one camera to detect humans, or human detection cameras, 530*a*, 530*b*, positioned at various locations within a predefined security zone (i.e., a region or location near the pill-filling station). For instance, the human detection cameras may be provided for imaging the given security zone to detect a human with the security zone. The human detection cameras may be 2D cameras or 3D cameras. In some embodiments, the security zone can be defined as the radius around the pill-filling station 11 to which the robotized arm 1000 can fully extend at least collide with a human. For example, the human detection cameras can be positioned on top of the pill-container rack 300 and/or on the robotized arm 1000. As well as the other components of the filling system or pill detecting system, the human detection cameras can be connected to the computer 20 and communicating with the medication dispensing system application 500. The medication dispensing system application can further be configured to detect the presence of a human being within the security zone. Notably, the medication dispensing system application can also comprise a human detection module 509. The human detection module may determine whether an individual is detected by one of the human detection cameras. Upon detection of an individual around the security zone, the medication dispensing system application can send instructions to the robotized arm to reduce its movement speed or simply stop altogether. In another possible embodiment, the human detection cameras may be complemented and/or replaced by motion sensors. Upon detecting movement around the security zone, the motion sensors may send a signal to the medication dispensing system application to stop or slow down the robotized arm.

In order to achieve the detection of humans around the security zone, the human detection module may comprise an algorithm to detect movement patterns from an image or video feed to detect the presence of a human. In particular, the algorithm may be an artificial intelligence (AI) algorithm trained to detect the shape and movement of an individual. The AI algorithm may be a convolutional neural network (CNN), a nearest neighbour network (KNN), a support-vector network (SVM) or other neural networks able to realize detection of humans from the images captured by the human detection cameras. The AI algorithm may also be configured to have a definite level of certainty before stopping the robotized arm. For example, if the AI algorithm infers a level of certainty above 75%, instructions may be transmitted to stop the robotized arm. However, the defined level of certainty may differ depending on the placement of the pill-filling station, the frequency of travel of individuals around the pill-filling station.

According to another possible embodiment, the medication dispensing system application 500 can further comprise a pill validation module 510. Similar to the human detection module 509, the pill validation module may also provide an artificial intelligence (AI) algorithm. The AI algorithm may be trained to detect pills from a video feed or a picture. Notably, the pill validation module algorithm may also use a CNN, KNN, SVM or other known algorithms able to detect pills from an image. The AI algorithm can be trained beforehand, based on samples of classified images of the pills available in an inventory corresponding to the pill-containers 320 of each drawer 310 of the pill-container rack 300. A pill validation camera 532 may be positioned near the pill-container retaining station 400. The pill validation camera 532 may also be connected to the computer and communicate with the medication dispensing system application modules. The pill validation camera can be tilted so that it can see the prongs of the vacuum pill-manipulator 200, while they are aligned with the photo-resisting sensors 417. The pill validation camera may then send images of the pills retained at the open-ended tips of the prongs of the vacuum pill-manipulator to the pill validation module 510. The pill validation module may thus determine whether the retained pills correspond to the given prescription instructions. If the retained pills do not correspond to the prescription instructions, the pill validation module may send instructions to retry suctioning the pills. The pill validation module can further be configured to validate the pill-retaining status of each prong 260. Notably, by receiving the signals from the photo-resisting sensors 417, the pill validation module can compare the pill-retaining status with the received prescription instructions. The pill validation module may again determine if there are any discrepancies between the pill-retaining status of each prong and the given prescription instructions.

According to another possible embodiment, the pill validation module 510 can further process pictures taken of the tray assemblies 90, for each prescription, in the pill-drop position, by the vacuum pill-manipulator web camera 210 (illustrated in FIG. 12). In a similar way, the pill validation module algorithm can detect each pill in the image and infer his associated name. The pill validation module algorithm can thus determine whether there is any discrepancy between the picture dans the electronic prescriptions. The pill validation module can further surround the region of interest of each pill in the picture and indicate its name (i.e., with a label), as well as the associated certainty level. The certainty level would represent a percentage of certainty of the association between the image and the pill label made by the AI algorithm. The picture may then be displayed to the professional for further analysis.

It will be appreciated from the foregoing disclosure that the filling system provided herein allows the autonomous detection and validation of pills through the filling steps of the blister package. Among other things, the present system ensures that the correct amount of pill is present in the pill-chambers of the blister pack. The system also allows a pharmacist or technician to easily ensure that the type of pill in the blister pack matches that of the associated prescription, and that the latter is changed if any discrepancies are detected. In addition, the proposed system allows any kind of pills to be released in the blister pack pill-chambers, without bouncing out of the pill-chamber and land outside the tray system or in another pill-chamber.

While the present disclosure has been described in conjunction with the exemplary embodiments described above, many equivalent modifications and variations will be apparent to those skilled in the art when given this disclosure. Accordingly, the exemplary embodiment set forth above is considered to be illustrative and not limiting. The scope of the claims should not be limited by the embodiment set forth in this disclosure but should be given the broadest interpretation consistent with the description as a whole.

The invention claimed is:

1. An automated blister pack filling system for grabbing and filling pills into a blister pack, the blister pack having pill-chambers, the blister pack filling system comprising:

a vacuum pill-manipulator being provided with prongs having open-ended tips to suction pills, each prong being arranged to be positioned opposite to one of the pill-chambers of the blister pack, the vacuum pill-manipulator being operable to transition from a pill-retaining configuration to a pill-releasing configuration, wherein:

in the pill-retaining configuration, suction is applied at the open-ended tips of the prongs to hold the pills in place when the vacuum pill-manipulator moves;

in the pill-releasing configuration, suction is reduced to drop the pills in corresponding ones of the pill-chambers, when the prongs are aligned therewith;

a collaborative robot provided with a robotized arm having at an end thereof the vacuum pill-manipulator, the collaborative robot controlling robotized arm and the vacuum pill-manipulator, the collaborative robot being configured to move the robotized arm between:

a pill-rack position where the vacuum pill-manipulator is configured to retrieve a pill-container from a pill-container rack;

a pill-grabbing position where the vacuum pill-manipulator is configured to place the pill-container on a pill-container retaining station and to suction pills from the pill-container, the vacuum pill-manipulator being in the pill-retaining configuration; and a blister-pack filling position where the vacuum pill-manipulator is configured to align the prongs of the vacuum pill-manipulator with the corresponding pill-chambers of the blister pack, the vacuum pill-manipulator transitioning to the pill-releasing configuration for filling the blister pack with the pills, a vacuum pump providing suction to the open-ended prongs of the vacuum pill-manipulator; and a processing device running a medication dispensing system application in communication with the collaborative robot and the vacuum pump, the medication dispensing system application being configured to control the collaborative robot and the vacuum pump based on instructions derived from electronic prescriptions;

wherein the medication dispensing system application is configured to compare a pill-retaining status of each prong of the vacuum pill-manipulator with information received from a prescription instruction and identify discrepancies therebetween, wherein the vacuum pill-manipulator further comprises light transmitters associated with each of the prongs, for emitting light at the open-ended tips of the prongs, the system further comprising:

photo-resisting sensors positioned to detect light from the light transmitters of the vacuum pill-manipulator; and a controller in communication with the photo-resisting sensors, configured to:

detect the pills at the open-ended tips of the prongs when no signal or a weak signal from a corresponding photo-resisting sensor is received, a properly suctioned pill preventing light from reaching the corresponding photo-resisting sensor: and send a signal including the pill-retaining status of each prong of the vacuum pill-manipulator to the medication dispensing system application.

2. The system according to claim 1, wherein the robotized arm is configured to move with at least six degrees of freedom (DoF).

3. The system according to claim 1, wherein:

the pill-container retaining station further comprises a load cell to measure a weight indicative of the weight of the pills within the pill-container, the load cell being in communication with the controller, the controller being further configured to send a second signal of the measured weight to the medication dispensing system application, the medication dispensing system application being configured to determine whether the pill-container should be refilled based on the measured weight.

4. The system according to claim 1, comprising:

the pill-container rack including a plurality of pill-containers, each pill-container being provided with a pill-container coupling; and wherein the vacuum pill-manipulator is provided with a manipulator-coupling adapted to connect to the pill-container coupling of each of the pill-containers, allowing the vacuum pill-manipulator to retrieve a given one of the pill-containers from the pill-container rack.

5. The system according to claim 4, wherein the pill-container coupling comprises a ferromagnetic element and the manipulator-coupling comprises an electromagnet, the vacuum pill-manipulator being adapted to selectively electromagnetically connect to the pill-containers.

6. The system according to claim 4, comprising:

the pill-container retaining station including a station-coupling, adapted to connect the pill-container coupling of each of the pill-containers, to retain the pill-container while the pills are being suctioned by the vacuum pill-manipulator.

7. The system according to claim 1, comprising:

at least one tray assembly for supporting the blister pack when the vacuum pill-manipulator fills the pills into the pills-chambers.

8. The system according to claim 7, wherein the at least one tray assembly comprises a depositing plate on which the pills are first deposited, before being pushed into the pill-chambers, the depositing plate being made of a material having elastic or damping properties chosen to reduce or avoid bouncing of the pills when dropped onto the depositing plate.

9. The system according to claim 8, wherein the tray assembly comprises a sliding tray placed over the depositing plate, the sliding tray being slidable by the collaborative robot from a pill-drop position to a chamber-filling position.

10. The system according to claim 7, wherein the at least one tray assembly comprises a tray-coupling, the vacuum pill-manipulator is provided with a manipulator-coupling adapted to connect to the tray-coupling, allowing the robotized arm to move the at least one tray assembly from one location to another.

11. The system according to claim 10, wherein the tray-coupling comprises a ferromagnetic element and the manipulator-coupling of the vacuum pill-manipulator comprises an electromagnet adapted to selectively electromagnetically connect to the tray-coupling.

12. The system according to claim 7, wherein the tray assembly comprises a mounting tray provided with rows of recesses, the mounting tray being shaped and configured to support the blister pack thereon, the pill-chambers filling in corresponding recesses of the mounting tray.

13. The system according to claim 7, wherein the tray assembly comprises a microcontroller, a communication module, a battery and a status interface to indicate the status of the communication module and/or the battery.

14. The system according to claim 1, comprising at least one camera to detect humans within a given security zone, the medication dispensing system application being configured to stop or reduce a speed of the robotized arm when a human is detected within the security zone.

15. The system according to claim 1, wherein the processing device is configured to generate prescription files associated with the electronic prescriptions, each prescription file comprising at least one of: a position of the pill-container(s); a barcode associated with the pill-container(s); a task identification number; a numeral representation of the pill-chambers of the blister pack and a number of pills required for each pill-chamber.

16. The system according to claim 1, wherein the medication dispensing system application is configured to include suction level instructions for the vacuum pump, based on a given type of pill, to apply appropriate level of suction to properly retain the pills by the vacuum pill-manipulator.

17. The system according to claim 1, wherein one of the collaborative robot and the vacuum pill-manipulator is provided with a camera adapted to capture images of the blister pack during or after filing of the blister pack.

18. An automated blister pack filling system for grabbing and filling pills into a blister pack, the blister pack having pill-chambers, the blister pack filling system comprising:

a vacuum pill-manipulator being provided with prongs having open-ended tips to suction pills, each prong being arranged to be positioned opposite to one of the pill-chambers of the blister pack, the vacuum pill-manipulator being operable to transition from a pill-retaining configuration to a pill-releasing configuration, wherein:

in the pill-retaining configuration, suction is applied at the open-ended tips of the prongs to hold the pills in place when the vacuum pill-manipulator moves;

in the pill-releasing configuration, suction is reduced to drop the pills in corresponding ones of the pill-chambers, when the prongs are aligned therewith;

a collaborative robot provided with a robotized arm having at an end thereof the vacuum pill-manipulator, the collaborative robot controlling robotized arm and the vacuum pill-manipulator, the collaborative robot being configured to move the robotized arm between:

a pill-rack position where the vacuum pill-manipulator is configured to retrieve a pill-container from a pill-container rack;

a pill-grabbing position where the vacuum pill-manipulator is configured to place the pill-container on a pill-container retaining station and to suction pills from the pill-container, the vacuum pill-manipulator being in the pill-retaining configuration; and a blister-pack filling position where the vacuum pill-manipulator is configured to align the prongs of the vacuum pill-manipulator with the corresponding pill-chambers of the blister pack, the vacuum pill-manipulator transitioning to the pill-releasing configuration for filling the blister pack with the pills, wherein the pill-container rack includes a plurality of pill-containers, each pill-container being provided with a pill-container coupling;

wherein the vacuum pill-manipulator is provided with a manipulator-coupling adapted to connect to the pill-container coupling of each of the pill-containers, allowing the vacuum pill-manipulator to retrieve a given one of the pill-containers from the pill-container rack; and wherein the pill-container coupling comprises a ferromagnetic element and the manipulator-coupling comprises an electromagnet, the vacuum pill-manipulator being adapted to selectively electromagnetically connect to the pill-containers.

19. The system according to claim 18, wherein:

the pill-container retaining station includes a station-coupling, adapted to connect the pill-container coupling of each of the pill-containers, to retain the pill-container while the pills are being suctioned by the vacuum pill-manipulator.

20. An automated blister pack filling system for grabbing and filling pills into a blister pack, the blister pack having pill-chambers, the blister pack filling system comprising:

a vacuum pill-manipulator being provided with prongs having open-ended tips to suction pills, each prong being arranged to be positioned opposite to one of the pill-chambers of the blister pack, the vacuum pill-manipulator being operable to transition from a pill-retaining configuration to a pill-releasing configuration, wherein:

in the pill-retaining configuration, suction is applied at the open-ended tips of the prongs to hold the pills in place when the vacuum pill-manipulator moves;

in the pill-releasing configuration, suction is reduced to drop the pills in corresponding ones of the pill-chambers, when the prongs are aligned therewith;

a collaborative robot provided with a robotized arm having at an end thereof the vacuum pill-manipulator, the collaborative robot controlling robotized arm and the vacuum pill-manipulator, the collaborative robot being configured to move the robotized arm between:

a pill-rack position where the vacuum pill-manipulator is configured to retrieve a pill-container from a pill-container rack;

a pill-grabbing position where the vacuum pill-manipulator is configured to place the pill-container on a pill-container retaining station and to suction pills from the pill-container, the vacuum pill-manipulator being in the pill-retaining configuration; and a blister-pack filling position where the vacuum pill-manipulator is configured to align the prongs of the vacuum pill-manipulator with the corresponding pill-chambers of the blister pack, the vacuum pill-manipulator transitioning to the pill-releasing configuration for filling the blister pack with the pills, at least one tray assembly for supporting the blister pack when the vacuum pill-manipulator fills the pills into the pills-chambers;

wherein the at least one tray assembly comprises a depositing plate on which the pills are first deposited, before being pushed into the pill-chambers, the depositing plate being made of a material having elastic or damping properties chosen to reduce or avoid bouncing of the pills when dropped onto the depositing plate.

21. The system according to claim 20, wherein the at least one tray assembly comprises a tray-coupling, the vacuum pill-manipulator is provided with a manipulator-coupling adapted to connect to the tray-coupling, allowing the robotized arm to move the at least one tray assembly from one location to another.

22. The system according to claim 21, wherein the tray-coupling comprises a ferromagnetic element and the manipulator-coupling of the vacuum pill-manipulator comprises an electromagnet adapted to selectively electromagnetically connect to the tray-coupling.

23. The system according to claim 20, wherein the tray assembly comprises a sliding tray placed over the depositing plate, the sliding tray being slidable by the collaborative robot from a pill-drop position to a chamber-filling position.

24. An automated blister pack filling system for grabbing and filling pills into a blister pack, the blister pack having pill-chambers, the blister pack filling system comprising:

a vacuum pill-manipulator being provided with prongs having open-ended tips to suction pills, each prong being arranged to be positioned opposite to one of the pill-chambers of the blister pack, the vacuum pill-manipulator being operable to transition from a pill-retaining configuration to a pill-releasing configuration, wherein:

in the pill-retaining configuration, suction is applied at the open-ended tips of the prongs to hold the pills in place when the vacuum pill-manipulator moves;

in the pill-releasing configuration, suction is reduced to drop the pills in corresponding ones of the pill-chambers, when the prongs are aligned therewith;

a collaborative robot provided with a robotized arm having at an end thereof the vacuum pill-manipulator, the collaborative robot controlling robotized arm and the vacuum pill-manipulator, the collaborative robot being configured to move the robotized arm between:

a pill-rack position where the vacuum pill-manipulator is configured to retrieve a pill-container from a pill-container rack;

a pill-grabbing position where the vacuum pill-manipulator is configured to place the pill-container on a pill-container retaining station and to suction pills from the pill-container, the vacuum pill-manipulator being in the pill-retaining configuration; and a blister-pack filling position where the vacuum pill-manipulator is configured to align the prongs of the vacuum pill-manipulator with the corresponding pill-chambers of the blister pack, the vacuum pill-manipulator transitioning to the pill-releasing configuration for filling the blister pack with the pills, at least one tray assembly for supporting the blister pack when the vacuum pill-manipulator fills the pills into the pills-chambers; and the tray assembly comprising a microcontroller, a communication module, a battery and a status interface to indicate the status of the communication module and/or the battery.

* * * * *